United States Patent
Holler et al.

(10) Patent No.: US 8,813,040 B2
(45) Date of Patent: *Aug. 19, 2014

(54) METHODS AND SYSTEMS FOR REPORTING ON BUILD RUNS IN SOFTWARE DEVELOPMENT

(71) Applicant: VersionOne, Inc., Alpharetta, GA (US)

(72) Inventors: Robert Holler, Cumming, GA (US); Ian Culling, Berkeley Lake, GA (US); Rajiv Delwadia, Jasper, GA (US); Pavel Mamut, Suwanee, GA (US); Mark Crowe, Atlanta, GA (US); Donald Hanson, Cumming, GA (US); Patrick Boudreaux, Cumming, GA (US); Dan Gilkerson, San Diego, CA (US); Eric Farr, Alpharetta, GA (US); Jerry Odenwelder, Atlanta, GA (US)

(73) Assignee: VersionOne, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,819

(22) Filed: Apr. 8, 2013

(65) Prior Publication Data

US 2013/0339932 A1 Dec. 19, 2013

Related U.S. Application Data

(63) Continuation of application No. 12/463,299, filed on May 8, 2009, now Pat. No. 8,418,147.

(51) Int. Cl.
*G06F 9/44* (2006.01)

(52) U.S. Cl.
USPC .............. 717/128; 717/131; 717/132

(58) Field of Classification Search
None
See application file for complete search history.

(56) References Cited

U.S. PATENT DOCUMENTS

| | | | |
|---|---|---|---|
| 5,544,300 A | 8/1996 | Skarbo et al. |
| 5,714,971 A | 2/1998 | Shalit et al. |
| 5,874,958 A | 2/1999 | Ludolph |
| 5,943,053 A | 8/1999 | Ludolph et al. |
| 5,956,030 A | 9/1999 | Conrad et al. |
| 6,175,364 B1 | 1/2001 | Wong et al. |

(Continued)

OTHER PUBLICATIONS

Akerman, Using ontology to support development of software architectures, 2006, 13 pgs.

(Continued)

*Primary Examiner* — Matt Kim
*Assistant Examiner* — Hua Lu
(74) *Attorney, Agent, or Firm* — Morgan, Lewis & Bockius LLP

(57) ABSTRACT

A method for reporting build runs includes: obtaining code changes for a software product; identifying the code change as affecting a work item of a software product under development, the work item specifies a feature to be added to or a defect to be removed from the software product; generating (i) a plurality of build runs of the software product, respective build runs corresponding to one or more code changes; and (ii) data associating the work item with one or more build runs that each correspond to at least one of the one or more code changes specified as involving the work item; receiving a user input selecting the work item; and in response to the user input, displaying respective identifiers of at least one build run of the one or more build runs associated with the work item, including presenting an identifier of the at least one build run.

19 Claims, 20 Drawing Sheets

(56) References Cited

U.S. PATENT DOCUMENTS

| | | | |
|---|---|---|---|
| 6,239,798 | B1 | 5/2001 | Ludolph et al. |
| 6,694,009 | B1 | 2/2004 | Anderson et al. |
| 6,698,013 | B1 | 2/2004 | Bertero et al. |
| 6,850,255 | B2 | 2/2005 | Muschetto |
| 7,051,038 | B1 | 5/2006 | Yeh et al. |
| 7,117,447 | B2 | 10/2006 | Cobb et al. |
| 7,210,093 | B1 | 4/2007 | Dutta |
| 7,272,815 | B1 | 9/2007 | Eldridge et al. |
| 7,376,891 | B2 | 5/2008 | Hitchock et al. |
| 7,415,677 | B2 | 8/2008 | Arend et al. |
| 7,490,314 | B2* | 2/2009 | Yuknewicz et al. ............ 717/105 |
| 7,640,496 | B1 | 12/2009 | Chaulk et al. |
| 7,644,390 | B2 | 1/2010 | Khodabandehloo et al. |
| 7,899,694 | B1 | 3/2011 | Marshall et al. |
| 7,930,201 | B1 | 4/2011 | Issa et al. |
| 8,370,803 | B1 | 2/2013 | Holler et al. |
| 2002/0062367 | A1 | 5/2002 | Debber et al. |
| 2002/0089526 | A1 | 7/2002 | Buxton et al. |
| 2002/0091732 | A1 | 7/2002 | Pedro |
| 2003/0033589 | A1 | 2/2003 | Reyna et al. |
| 2003/0046282 | A1 | 3/2003 | Carlson et al. |
| 2003/0061330 | A1 | 3/2003 | Frisco et al. |
| 2003/0103079 | A1 | 6/2003 | Adatia et al. |
| 2003/0158845 | A1 | 8/2003 | Braley |
| 2003/0160815 | A1 | 8/2003 | Muschetto |
| 2003/0163404 | A1 | 8/2003 | Hu et al. |
| 2003/0172020 | A1 | 9/2003 | Davies et al. |
| 2003/0182470 | A1 | 9/2003 | Carlson et al. |
| 2003/0182652 | A1* | 9/2003 | Custodio .................. 717/122 |
| 2003/0188290 | A1 | 10/2003 | Corral |
| 2003/0204644 | A1 | 10/2003 | Vincent |
| 2004/0081951 | A1 | 4/2004 | Vigue et al. |
| 2004/0186762 | A1 | 9/2004 | Beaven et al. |
| 2004/0243457 | A1 | 12/2004 | D'Andrea et al. |
| 2004/0243968 | A1 | 12/2004 | Hecksel |
| 2004/0268246 | A1 | 12/2004 | Leban et al. |
| 2005/0004825 | A1 | 1/2005 | Ehrler et al. |
| 2005/0065951 | A1 | 3/2005 | Liston et al. |
| 2005/0086239 | A1 | 4/2005 | Swann et al. |
| 2005/0086638 | A1 | 4/2005 | Farn |
| 2005/0114829 | A1* | 5/2005 | Robin et al. ................. 717/101 |
| 2005/0114830 | A1 | 5/2005 | Knutson et al. |
| 2005/0132048 | A1 | 6/2005 | Kogan et al. |
| 2005/0198615 | A1 | 9/2005 | Choi et al. |
| 2005/0216879 | A1 | 9/2005 | Ruhe |
| 2005/0229157 | A1 | 10/2005 | Johnson |
| 2006/0069604 | A1 | 3/2006 | Leukart et al. |
| 2006/0123389 | A1 | 6/2006 | Kolawa et al. |
| 2006/0212327 | A1 | 9/2006 | Norman |
| 2006/0235771 | A1 | 10/2006 | Oberoi |
| 2006/0236261 | A1 | 10/2006 | Forstall et al. |
| 2007/0033567 | A1 | 2/2007 | Carlson et al. |
| 2007/0094609 | A1 | 4/2007 | Gilboa et al. |
| 2007/0124682 | A1 | 5/2007 | Fukeda et al. |
| 2007/0168918 | A1* | 7/2007 | Metherall et al. ............ 717/101 |
| 2007/0288292 | A1 | 12/2007 | Gauger |
| 2008/0077416 | A1 | 3/2008 | Hetrick |
| 2008/0077530 | A1* | 3/2008 | Banas et al. .................. 705/50 |
| 2008/0097734 | A1 | 4/2008 | Raffo |
| 2008/0154749 | A1 | 6/2008 | D'hooghe et al. |
| 2008/0172625 | A1 | 7/2008 | Montgomery |
| 2008/0282228 | A1 | 11/2008 | Subramanyam |
| 2008/0301296 | A1* | 12/2008 | York ............................ 709/225 |
| 2009/0024647 | A1 | 1/2009 | Hein |
| 2009/0204465 | A1 | 8/2009 | Pradhan |
| 2009/0271760 | A1 | 10/2009 | Ellinger |
| 2009/0300580 | A1* | 12/2009 | Heyhoe et al. ................ 717/106 |
| 2010/0088664 | A1* | 4/2010 | Khodabandehloo et al. . 717/103 |
| 2010/0218092 | A1 | 8/2010 | Xiang et al. |
| 2010/0306730 | A9 | 12/2010 | Carlson et al. |

OTHER PUBLICATIONS

Ayewah, Evaluating Status Analysis Defect Warnings on Production Software, 2007, 7 pgs.

Barton, Reporting scrum project progress to executive management through metrics, Jan. 2005, 9 pgs.

Boehm, A View of 20th and 21st Century Software Engineering, 2006, 18 pgs.

Cause, Delivering real business value using FDD, Winter 2004, 13 pgs.

Ceschi, Project management in plan-based and agile companies, 2005, 7 pgs.

Cruise control, cruisecontrol.sourceforce.net, Apr. 9, 2010, 1 pg.

Cruise control, cruisecontrol.sourceforge.net, Apr. 9, 2010, 34 pgs.

Danube Technologies, ScrumWorks pro web client user guide, Feb. 2007, 7 pgs.

Danube Technologies, ScrumWorks quick start guide, v.1.4.2, Jan. 2006, 10 pgs.

Danube Technologies, ScrumWorks web client user guide, v.1.4.2., Jan. 2006, 6 pgs.

DeLuca, FDD implementations, Nov. 2005, 10 pgs.

DeLuca, Parking lot chart—aesthetics, Mar. 16, 2007, 2 pgs.

DeLuca, Parking lot chart example 1, Dec. 17, 2003, 2 pgs.

DeLuca, Parking lot chart example 2, Nov. 20, 2003, 1 pg.

DeLuca, Parking lot chart—legend, Mar. 16, 2007, 2 pgs.

Derby, Agile retrospectives, The Pragmatic Bookshelf, 2006, 186 pgs.

Fowler, The new methodology, Dec. 13, 2005, 19 pgs.

Holler, Notice of Allowance, U.S. Appl. No. 12/016,192, Sep. 28, 2012, 8 pgs.

Holler, Notice of Allowance, U.S. Appl. No. 12/247,963, Jan. 30, 2013, 8 pgs.

Holler, Office Action, U.S. Appl. No. 12/016,191, Nov. 12, 2010, 10 pgs.

Holler, Office Action, U.S. Appl. No. 12/016,191, Dec. 16, 2011, 13 pgs.

Holler, Office Action, U.S. Appl. No. 12/016,191, Jul. 19, 2012, 12 pgs.

Holler, Office Action, U.S. Appl. No. 12/016,191, Jun. 19, 2013, 13 pgs.

Holler, Office Action, U.S. Appl. No. 12/016,191, May 27, 2011, 16 pgs.

Holler, Office Action, U.S. Appl. No. 12/016,192, Nov. 18, 2011, 10 pgs.

Holler, Office Action, U.S. Appl. No. 12/016,192, Apr. 26, 2011, 11 pgs.

Holler, Office Action, U.S. Appl. No. 12/016,192, Apr. 30, 2012, 12 pgs.

Holler, Office Action, U.S. Appl. No. 12/016,193, Jul. 9, 2012, 10 pgs.

Holler, Office Action, U.S. Appl. No. 12/016,193, Jan. 30, 2013, 13 pgs.

Holler, Office Action, U.S. Appl. No. 12/101,084, Feb. 18, 2011, 14 pgs.

Holler, Office Action, U.S. Appl. No. 12/101,084, Jun. 21, 2013, 14 pgs.

Holler, Office Action, U.S. Appl. No. 12/101,084, Aug. 26, 2011, 17 pgs.

Holler, Office Action, U.S. Appl. No. 12/101,089, Jan. 9, 2012, 11 pgs.

Holler, Office Action, U.S. Appl. No. 12/101,089, Jun. 20, 2013, 13 pgs.

Holler, Office Action, U.S. Appl. No. 12/101,089, May 23, 2012, 16 pgs.

Holler, Office Action, U.S. Appl. No. 12/174,511, Jan. 4, 2013, 23 pgs.

Holler, Office Action, U.S. Appl. No. 12/174,511, Nov. 10, 2011, 18 pgs.

Holler, Office Action, U.S. Appl. No. 12/174,511, May 11, 2012, 21 pgs.

Holler, Office Action, U.S. Appl. No. 12/245,566, May 14, 2012, 15 pgs.

Holler, Office Action, U.S. Appl. No. 12/245,566, Apr. 24, 2013, 17 pgs.

Holler, Office Action, U.S. Appl. No. 12/245,566, Nov. 30, 2012, 16 pgs.

Holler, Office Action, U.S. Appl. No. 12/247,939, Jun. 7, 2012, 9 pgs.

(56) References Cited

OTHER PUBLICATIONS

Holler, Office Action, U.S. Appl. No. 12/247,939, Nov. 19, 2012, 9 pgs.
Holler, Office Action, U.S. Appl. No. 12/247,939, Apr. 26, 2013, 5 pgs.
Holler, Office Action, U.S. Appl. No. 12/247,963, Jul. 9, 2012, 23 pgs.
Holler, Office Action, U.S. Appl. No. 12/247,963, Mar. 15, 2012, 20 pgs.
Holler, Office Action, U.S. Appl. No. 12/247,963, Jun. 30, 2011, 18 pgs.
Holler, Office Action, U.S. Appl. No. 12/357,225, Oct. 3, 2013, 29 pgs.
Holler, Office Action, U.S. Appl. No. 12/357,225, Jul. 19, 2012, 28 pgs.
Holler, Office Action, U.S. Appl. No. 12/357,225, Nov. 23, 2012, 30 pgs.
IBM / Cognos Software, Budgeting and forecasting software, Jun. 2, 2009, 3 pgs.
JetBrains, Distributed build management and continuous integration server, Apr. 9, 2010, 2 pgs.
JetBrains, Distributed build management and continuous integration server: features, Apr. 9, 2010, 2 pgs.
JetBrains, TeamCity 3.0-overview, Jun. 28, 2010, 8 pgs.
JetBrains, TeamCity 4.5, 2003-2009, 2 pgs.
Kolcz, Using SPEM/UML Profile to Specification of IS Development Processes, Oct. 2006, 68 pgs.
Li, Empirical Evaluation of Defect Projection Models for Widely-deployed Production Software Systems, 2004, 10 pgs.
Lyu, Software Reliability Engineering: A Roadmap, 2007, 18 pgs.
Microsoft Office Online, Demo: Base sales forecasts and trendlines on data, Jun. 2, 2009, 3 pgs.
Microsoft Office Online, Demo: Check that hunch with Excel what-if scenarios, Jun. 2, 2009, 1 pg.
Microsoft Office Online, Show trends and forecast sales with charts, Jun. 2, 2009 7 pgs.
Microsoft Office Online, Understanding scheduling in Microsoft Project 2002, 7 pgs.
Mountain Goat Software, Training for Scrum task board use, 1998-2010, 5 pgs.
Netsuite, Standard & advanced sales forecasting software, (no date available) 6 pgs.
Odenwelder, Notice of Allowance, U.S. Appl. No. 12/463,299, Dec. 4, 2012, 13 pgs.
Odenwelder, Office Action, U.S. Appl. No. 12/463,299, Apr. 25, 2012, 18 pgs.
Robbins, Adopting Open Source Software Engineering Practices by Adopting OSSE Tools, 2005, 16 pgs.
Sandler, Source control in ten minutes: a subversion tutorial, Jan. 24, 2006, 6 pgs.
Screenshot of Xplanner Date, Apr. 8, 2010, 1 pg.
Sugarcrm, Sugarsuite screenshot, Apr. 8, 2010, 1 pg.
Vanguard Software, Forecasting software, Jun. 2, 2009, 4 pgs.
VersionOne, Exhibits A&B, May 31, 2007 Figures 1&2, 2 pgs.
VersionOne, Frequently asked questions, 2005, 4 pgs.
VersionOne, Simplify the rollout of agile development within your organization, 2007, 2 pgs.
VersionOne, Simplifying software delivery, 2006, 1 pg.
Xplanner how to notes, May 10, 2005, 9 pgs.
Yu, A Versatile Development Process for Small to Large Projects Using IBM CMVC, 1994, 9 pgs.
Chou, Redesigning a large and complex website: how to begin and a method for success, ACM, Providence, RI, Nov. 20-23, 2002, pp. 22-28.
Holler, Notice of Allowance, U.S. Appl. No. 12/016,191, Jan. 15, 2014, 7 pgs.
Holler, Notice of Allowance, U.S. Appl. No. 12/245,566, Nov. 26, 2013, 11 pgs.
Ouimet, Sert: Software Tool for Generating Student Engagement Reports, IEEE, ITNG'07, 2007, 8 pgs.
Phan et al., Progressive Multiples for Communication-Minded Visualization, ACM, Montreal, Canada, May 28-30, 2007, pp. 225-232.
Ribarsky et al., Glyphmaker: Creating Customized Visualizations of Complex Data, IEEE, Jul. 1994, pp. 57-64.
Shih et al., Using URLs and Table Layout for Web Classification Tasks, ACM, New York, NY, May 17-22, 2004, pp. 193-202.
Sneed, Reengineering Reports, IEEE, WRCE'04, 2004, 10 pgs.

* cited by examiner

File | Plan Backlog Item | View | Go | Bookmarks | Tools | Help    http://www.secure.v1host.com/

Backlog Item Planner

Backlog Item

Main

ID: B-01019
Title: Enter RMA
Project: Team A
Iteration: Month C 1st Half — 272
Feature Group: Administration
Description:
Estimate: 2.00

Tasks and Tests — 273

| Title 212 | ID 214 | Owner 216 | Estimate 268 | | |
|---|---|---|---|---|---|
| Enter RMA Using Order Number — 274 | AT-01034 | BT | 4.00 | Add Task | 275  Add Test | 276  Customize | Export (.xls) |
| Enter RMA Without Order Number | AT-01068 | BT | 4.00 | | 277 → Edit | More |
| Build | TK-01070 | AS | 8.00 | | Edit | More |
| Code Review | TK-01072 | TC,DD | 4.00 | | Edit | More 286 |

Test

Main

ID: AT-01034
Title: Enter RMA Using Order Number — 279
Description: This test will encompass a set of criteria specific to the condition of new prospect behavior. There are
  several points of focus including:
  - Call Time
  - Availability
— 284

▶ — 280

Owner: BT — 281
Estimate: 4.00 — 282   ▶ — 283

285 — OK | Cancel

METHODS AND SYSTEMS FOR REPORTING ON BUILD RUNS IN SOFTWARE DEVELOPMENT

RELATED APPLICATIONS

This application is a continuation of U.S. patent application Ser. No. 12/463,299, filed May 8, 2009, which is incorporated herein by reference in its entirety.

TECHNICAL FIELD

The disclosed embodiments relate generally to project management software, and more particularly, to reporting associations between build runs and work items using software development project management software.

BACKGROUND

Agile software development refers to software development methodologies in which software is developed incrementally in steps referred to as iterations. Iterations typically are measured in weeks and may vary in length from one week or less to one month or more. Examples of agile software development methodologies include Scrum, Extreme Programming (XP), Crystal, Lean Development, AgileUP, and Dynamic Systems Development Method (DSDM). Agile software development methods also have been referred to as lightweight methods. Methodologies may have their own vocabulary. For example, an iteration may be referred to as a sprint or a timebox, depending on the methodology. Agile software development is distinguishable from the "waterfall" model of sequential software development.

Software for implementing agile development methodologies, or other types of software for managing software development, allows work items associated with development of a software project to be tracked. Examples of work items include, without limitation, features to be implemented, defects to be fixed, and tasks and tests associated with implementing features and fixing defects. Software developers, testers, and project managers may desire to view the relationships between work items and code changes in a user-friendly and efficient manner.

SUMMARY

Systems and method for reporting on build runs are disclosed. In some embodiments, a method includes: obtaining a plurality of code changes for a software product; and identifying the plurality of code change as affecting a work item of a software product under development. The work item specifies a feature to be added to the software product or a defect to be removed from the software product. In some implementations, the method also includes generating (i) a plurality of build runs of the software product, respective build runs corresponding to one or more code changes in the plurality of code changes; and (ii) data associating the work item with one or more build runs that each correspond to at least one of the one or more code changes specified as involving the work item; receiving a user input selecting the work item; and in response to the user input, displaying respective identifiers of at least one build run of the one or more build runs associated with the work item, including presenting an identifier of the at least one build run.

BRIEF DESCRIPTION OF THE DRAWINGS

FIGS. 2C and 2D are schematic screenshots of a user interface for viewing an asset's attributes and related assets in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments.

Figure 1:
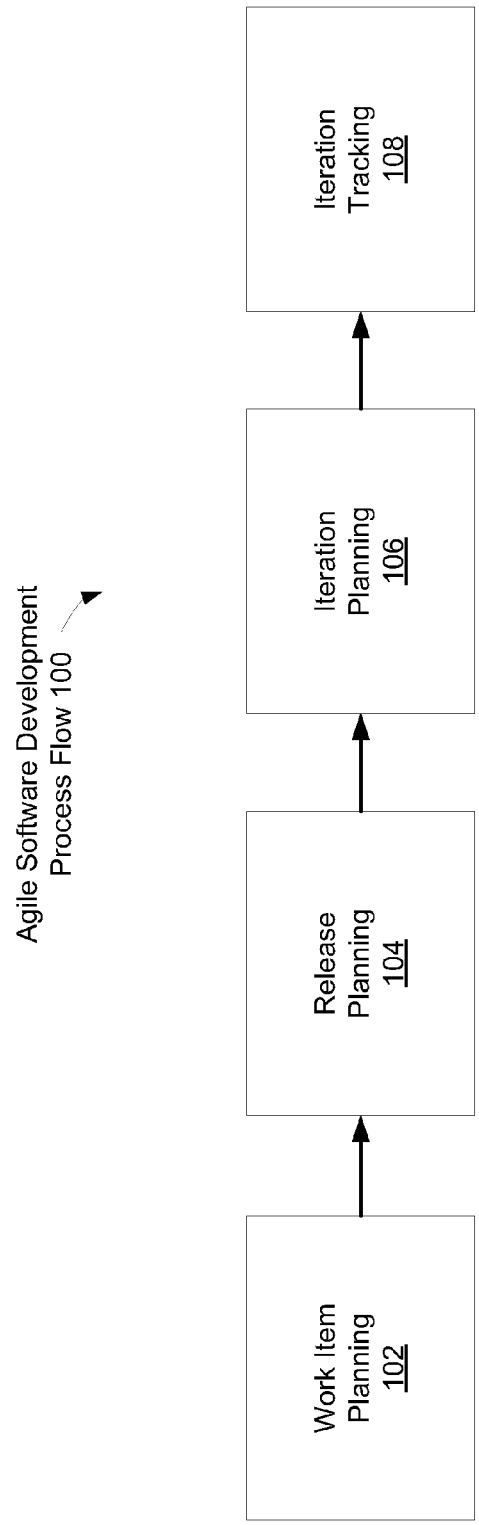
FIG. 1 is a flow diagram illustrating an agile software development process flow in accordance with some embodiments.

FIG. 1 is a flow diagram illustrating an agile software development process flow 100 in accordance with some embodiments. Support for performing operations in the process flow 100 can be provided by agile development management software.

Work item planning (102) includes identifying work to be performed during the software development process. For example, features to be included in the software being developed are specified and software defects to be fixed during development are identified. Depending on the agile methodology being used, features also may be referred to as stories, backlog items, or requirements. In the context of agile software development, a work item is any item for which the agile development management software platform can track progress, such as time spent working on the item. Estimates for the time that work items require for completion (e.g., the time to complete features or to fix defects) may be entered during the work item planning process. Furthermore, groups of work items may be defined. For example, a feature group may be defined to include a plurality of features. In some embodiments, a group of related features is referred to as a theme. In some embodiments, a group of features that constitute a single large or complex feature is referred to as an epic. Defined groups of work items may contain different types or levels of work items and thus be hierarchical, or alternatively may contain a single type or level of work items and thus be flat. Work estimates for the features within a feature group may be added together to provide an overall work estimate for the feature group. The work estimate for a group of work items (e.g., a feature group) thus may provide a roll-up of the work estimates for the individual work items (e.g., features) in the group.

Release planning (104) includes assigning identified work items (e.g., features and defects) to particular planned software releases. For example, certain features may be included in an initial release, with additional features to be added in subsequent releases. Similarly, fixing various defects may be scheduled across multiple releases. More generally, release planning may include assigning identified work items to levels or nodes in a project hierarchy. The project hierarchy may include projects, sub-projects, releases, teams and other internal organizations, clients or customers, and vendors.

Iteration planning (106) includes assigning work items to iterations. There may be multiple iterations performed to prepare a particular software release; iteration planning thus involves specifying what work will be performed in which iterations. For example, features and defects are assigned to particular iterations. Within each iteration, tasks and tests corresponding to the features and defects are defined. A task is a unit of work performed as part of delivering a feature. In some embodiments, a task is defined such that it takes no more than 3 days to perform. A test is an acceptance criterion that a feature must satisfy. Estimates for the time required to complete tests and tasks may be entered. In some embodiments, the estimates for tasks and tests are independent of the estimates for their features. Tasks and tests are examples of work items.

The actual time spent working on the work items (e.g., on the features and defects and their corresponding tasks and tests) during an iteration is tracked (108) and compared against the estimates. Progress and status reports may be displayed graphically. For example, a "dashboard" user interface may display multiple graphical reports. Possible graphical reports include burndown charts, velocity charts, burn-up charts, Gantt charts, parking lot reports, scope change, defect trending, test case status, and defect actuals. A burndown chart illustrates remaining work vs. time. Velocity refers to the estimated work per iteration on a project. Scope change refers to a change in requirements, such as the addition or deletion of features and defects. Reports may be generated for a specified level or node in the project hierarchy (e.g., for a specified project, sub-project, release, team or other internal organization, client or customer, and/or vendor.) Reports may be generated to display relationships between work items and build runs.

The operations in the development process flow 100 are presented sequentially in FIG. 1 for purposes of illustration. However, the operations need not be performed sequentially. For example, the planning operations 102, 104, and 106 may be updated dynamically throughout the agile development process. Similarly, tracking 108 may be performed dynamically, and may prompt subsequent planning changes. Furthermore, multiple operations may be combined into a single operation and additional operations may be added to the flow 100.

As used herein, terms such as "work item," "release," and "project hierarchy" are not limited to the context of agile development management software, but instead may apply to any type of project management software for developing software. A work item thus is any item associated with software development for which project management software can track progress, such as time spent working on the item. A release may refer to any type of software product release. A project hierarchy may refer to any set of levels or nodes associated with a software development project being managed using project management software.

At a high level, a software project development process such as the agile software development process 100 has various assets associated with it. Nodes in the project hierarchy, such as projects, sub-projects, releases, teams, clients, and vendors, can be considered assets, as can iterations. Work items such as features and defects are assets, as are tasks and tests. Feature groups are assets. Assets may be associated with (i.e., related to) other assets. In some embodiments, for example, tasks and tests are associated with corresponding features and defects, which in turn may be associated with corresponding iterations. In another example, features in a particular feature group are associated with the feature group.

An asset includes various attributes. In some embodiments, each kind of asset (e.g., work item, project, goal, feature group, feature, task, etc.) has a specified set of associated, or related, attributes. Types of attributes include text strings, numerical values, values calculated according to a formula ("synthetic attributes"), and associated/related assets. A first asset associated with (i.e., related to) a second asset thus is considered an attribute of the second asset. An attribute may be automatically included (e.g., hard-coded or created for a particular installation) in project management software or may be customized (i.e., user-defined).

Attention is now directed to user interfaces (UIs) for software development project management software. While the following UIs are described with respect to agile development management software, analogous UIs may be provided by other types of software development project management software. In some embodiments, UIs are shown in a browser window. In some embodiments, UIs are shown by a standalone application.

Agile development management software can display groups of assets of a particular type. For example, groups of assets associated with work item planning, release planning, or iteration planning may be displayed.

Figure 2A:
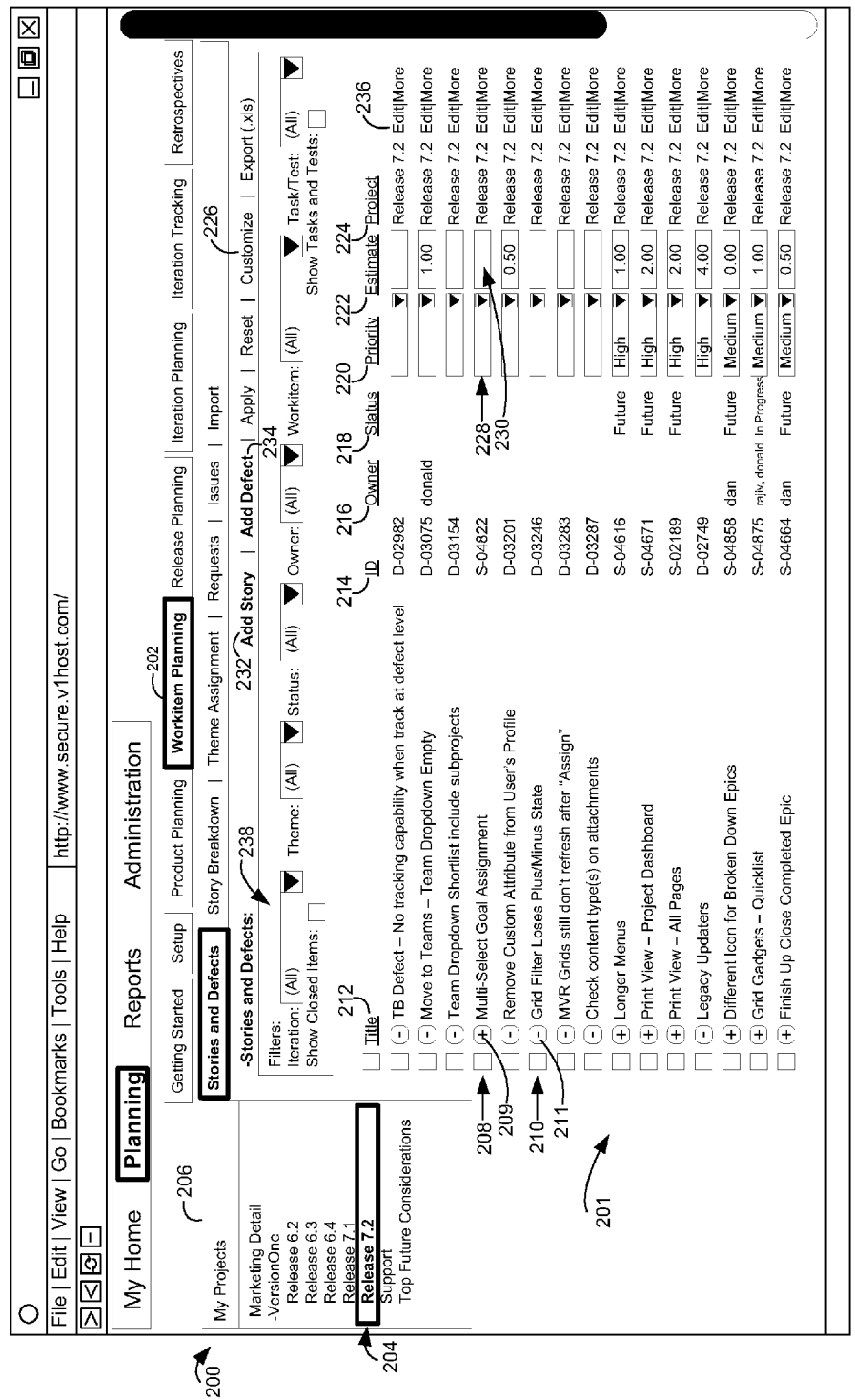
FIGS. 2A and 2B are schematic screenshots of a user interface displaying assets associated with an agile software development process in accordance with some embodiments.

FIG. 2A is a schematic screenshot of a user interface 200 displaying a group 201 of assets associated with an agile software development process, in accordance with some embodiments. In some embodiments, the particular type of group is determined by selecting a tab, selection box, radio button icon, or item in a drop-down menu. For example, in FIG. 2A a "workitem planning" tab 202 has been selected, indicating that the group 201 is a work item planning group. A group of a particular type may include multiple kinds of assets. For example, the work item planning group 201 includes features (e.g., "Multi-Select Goal Assignment" 208)

and defects (e.g., "Grid Filter Loses Plus/Minus State" 210), as indicated by features icons 209 and defects icons 211.

The displayed assets in the group 201 are associated with a particular project hierarchy node 204, displayed for example in a project selection window 206.

Assets may be added to the group 201, for example, by selecting an "add story" (i.e., add feature) link 232 or an "add defect" link 234. In general, a user interface for displaying a group of assets may include multiple links or icons for adding multiple respective kinds of assets, or may include a single link or icon for adding assets (e.g., a single "add work item" link (not shown)). In some embodiments, selection of a link or icon for adding assets results in the display of a separate user interface for adding assets (not shown).

Assets displayed in the group 201 also may be edited, for example, by selecting an "edit" link (e.g., 236) corresponding to a respective asset. In some embodiments, selection of an edit link or corresponding icon results in the display of a separate user interface for editing assets, as described below with regard to FIGS. 2B-2D.

The displayed assets include a set of attributes selected for display, such as title 212, ID 214, owner 216, status 218, priority 220, estimate 222, and project 224. Some of the attributes are also assets, such as project 224. Some of the values for the attributes are blank: for example, no owner 216, status 218, priority 220, or estimate 222 is shown for a number of assets, including feature 208.

Assets to be displayed in the group 201 may be filtered according to one or more attributes using filters 238.

A subset of the displayed attributes includes user input fields to accept edits to attribute values. For example, a user may select a priority from a drop-down box 228 and may enter a work or size estimate (e.g., an estimate of time) in a text input box 230.

Figure 2B:
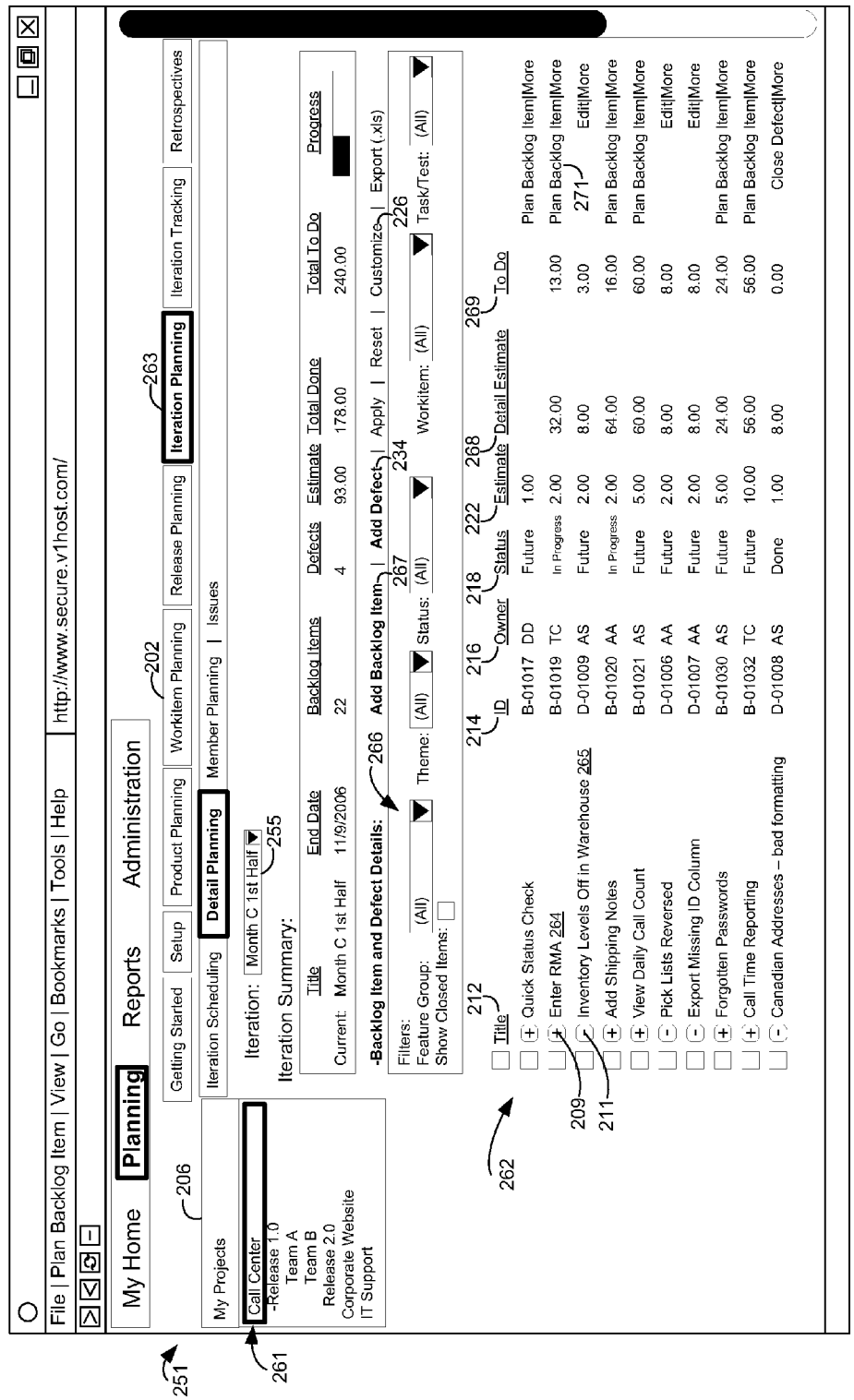

FIG. 2B, like FIG. 2A, is a schematic screenshot of a user interface displaying a group of assets associated with an agile software development process in accordance with some embodiments. Specifically, the user interface 251 of FIG. 2B displays a group 262 of assets associated with iteration planning, as indicated by selection of an "iteration planning" tab 263. The iteration planning group 262 includes features (e.g., "Enter RMA" 264) and defects (e.g., "Inventory Levels Off in Warehouse" 265), as indicated by features icons 209 and defects icons 211. The displayed assets in the group 262 are associated with a particular iteration 255. The displayed assets in the group 262 also are associated with a particular project hierarchy node 261 (also referred to as a project hierarchy level 261), displayed for example in the project selection window 206. The project hierarchy node 261 corresponds to a project entitled "Call Center," which includes multiple software releases (e.g., "Release 1.0" and "Release 2.0") and has multiple teams (e.g., "Team A" and "Team B") working on releases. Each release and each team may be selected as a project hierarchy node in the project selection window 206. In some embodiments, in response to selection of a particular project hierarchy node, the displayed group of assets is updated to display assets associated with the selected project hierarchy node. For example, in response to selection of a particular release or team, the displayed group 262 of assets is updated to display assets associated with iteration planning for the selected release or team.

Assets to be displayed in the group 262 may be filtered according to one or more attributes using filters 266. Assets may be added to the group 262 by, for example, selecting an "add backlog item" link 267 or an "add defect" link 234.

The displayed assets in the group 262 include a set of attributes, such as title 212, ID 214, owner 216, status 218, estimate 222, detail estimate 268, and "to do" 269. The "estimate" 222 and "detail estimate" 268 attributes provide estimates of quantities of work associated with assets, while the "to do" 269 attribute provides estimates of quantities of work remaining to be done for assets. As discussed with regard to FIG. 2A, some of the attributes may be assets associated with a displayed asset in the group 262 (i.e., may be related assets).

Figure 2C:
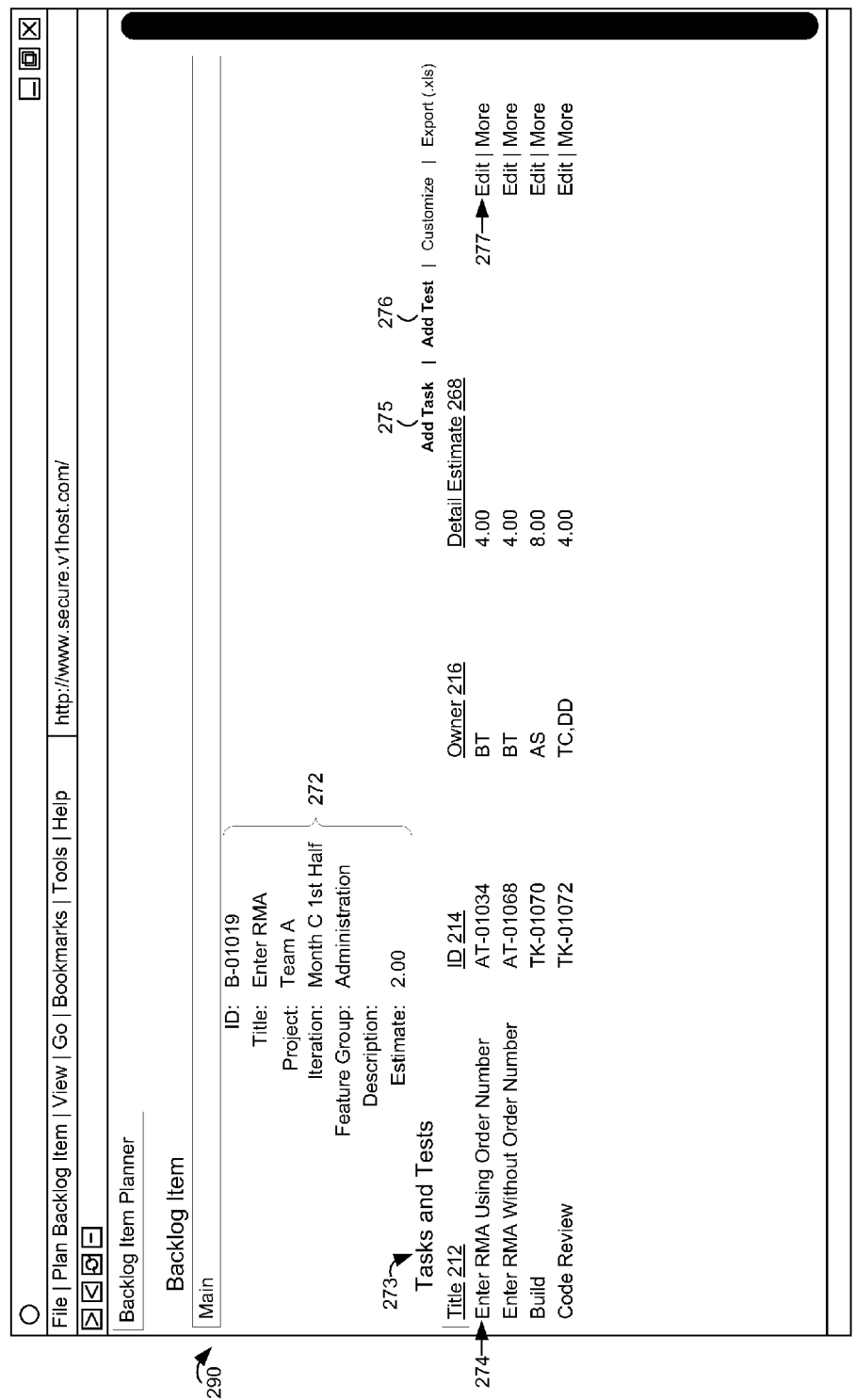

In some embodiments, an asset displayed in the group 262 may be edited by selecting a link corresponding to the asset, which results in display of a separate user interface (UI) for editing the asset. For example, selection of the "plan backlog item" link 271 for the "enter RMA" asset 264 results in display of a window 290 (FIG. 2C). ("Backlog item" in this context is a type of work item). The window 290 displays attributes 272 of the "enter RMA" asset 264, such as ID, title, project, iteration, feature group, description, and estimate. In some embodiments, the attributes are displayed in a list.

The window 290 also displays related assets 273 associated with the "enter RMA" asset 264. In this example, the related assets 273 include tasks and tests associated with the "enter RMA" asset 264, which is a feature. Attributes of the related assets 273 (e.g., title 212, ID 214, owner 216, and detail estimate 268) are displayed.

The related assets 273 may be edited by selecting a corresponding link. For example, related asset 274 ("Enter RMA Using Order Number") may be edited by selecting an "edit" link 277. In some embodiments, in response to selection of the "edit" link 277, a UI 278 (FIG. 2D) for editing the related asset 274 is displayed in the window 290 along with the attributes 272 and related assets 273. The UI 278 includes user input fields (e.g., 279, 281, 283, and 284) to display and receive edits to attributes of the related asset 274. In some embodiments, the UI 278 includes drop-down menus (e.g., 280, 282) to select values for attributes of the related asset 274. In some embodiments, the user may enter values directly into the user input fields. Edits may be applied by selecting the "OK" link 285 or canceled by selecting the "cancel" link 286. In some embodiments, upon selection of the "OK" link 285, display of the UI 278 is ceased and displayed attribute values for the edited related asset 274 are updated in response to the edits. The user then may select another edit link associated with another related asset, resulting in display of another UI 278 within the window 290 for displaying and editing the newly selected related asset. In some embodiments, multiple UI's for displaying and editing multiple respective related assets may be open simultaneously within the window 290 and may be accessed simply by scrolling within the window 290.

In some embodiments, a new related asset may be added via the window 290. For example, a new task or test for the "enter RMA" asset 264 may be added by selecting the "add task" link 275 or "add test" link 276. In some embodiments, selection of the "add task" link 275 or "add test" link 276 results in display, within the window 290, of a user interface analogous to UI 278 for which the user input fields (e.g., 279, 281, 283, and 284) are blank. The user may enter attribute values for the new task or test through the user input fields. In some embodiments, the user may specify attribute values via drop-down menus (e.g., 280, 282). In some embodiments, creation of the new task or test is completed by selecting the "OK" icon 285 or canceled by selecting the "cancel" icon 286. In some embodiments, upon selection of the "OK" icon 285, display of the UI for creating the new related asset is ceased and the new related asset is displayed among the related assets 273.

The window 290 thus provides a single integrated interface through which a user may view multiple levels of information for an asset in addition to performing edits. For example, the user may view attributes of the asset itself and of related assets, and may edit or create related assets. The integrated interface allows the user to perform these tasks without having to browse through a succession of windows.

Figure 2E:
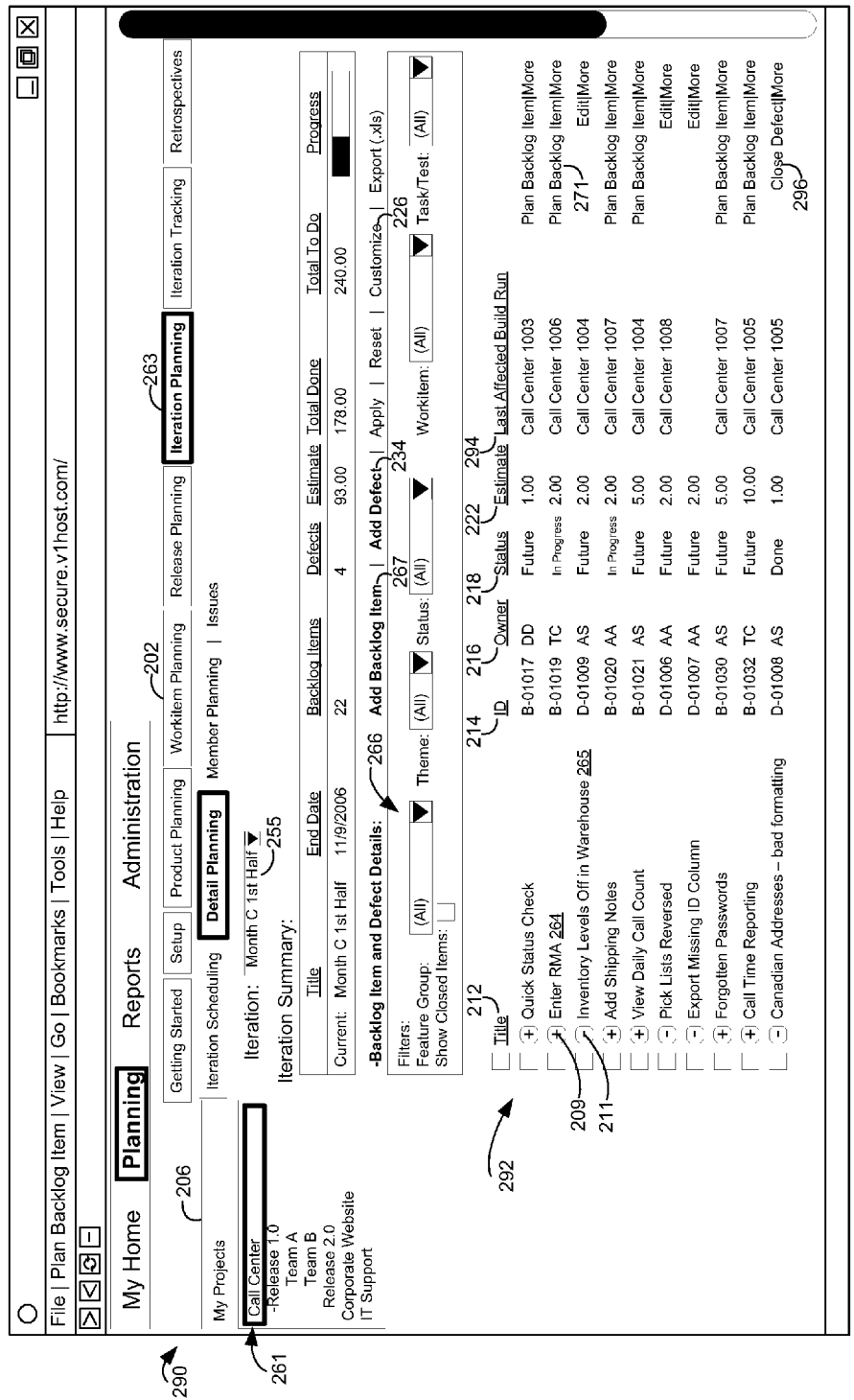
FIG. 2E is a schematic screenshot of a user interface displaying assets with attributes including a last affected build run in accordance with some embodiments.

FIG. 2E, like FIGS. 2B and 2A, is a schematic screenshot of a user interface 290 displaying a group 292 of assets associated with an agile software development process in accordance with some embodiments. The assets of the group 292 are work items, such as features (e.g., Enter RMA 264) and defects (e.g., Inventory Levels off in Warehouse 265). The group 292 of work items is identical to the group 262 (FIG. 2B) except that different attributes are displayed. In addition to ID 214, owner 216, status 218, and estimate 222, an attribute entitled Last Affected Build Run 294 is displayed for the assets in the group 292. The term "build run" refers to the result of performing a build of a particular piece of software. Build run generation is discussed in more detail below with regard to FIG. 3. In some embodiments, the last affected build run 294 is the build run in which a work item is completed, fixed, verified, or most recently worked on. For example, if the work item is a feature, the last affected build run could be the build run in which the feature was fully implemented, or alternatively, the build run in which the feature was verified. If the feature has not yet been fully implemented, the last affected build run could be the most recent build run having code changes involving the feature. If the work item is a defect, the last affected build run could be the build run in which the defect was fixed or in which the fix was verified. If the defect has not yet been fixed, the last affected build run could be the most recent build run having code changes involving the defect. In some embodiments, selection of a Close Defect link 296 results in display of a UI (not shown) that enables the user to specify that a defect has been fixed; this UI includes a user input field to update the last affected build run 294 for the defect.

The UI 290 enables a developer or quality engineer to determine the appropriate build to use to verify a group of work items. For example, to verify all work items displayed in the group 292, a quality engineer would select the "Call Center 1008" build run, or a more recent build run, because "Call Center 1008" is the most recent of the build runs displayed under Last Affected Build Run 294.

In some embodiments, a group of work items such as the group 292 includes one or more other attributes involving build runs in addition to or as an alternative to the last affected build run 294. For example, a list of defects may include the build runs in which respective defects were found.

Figure 2F:
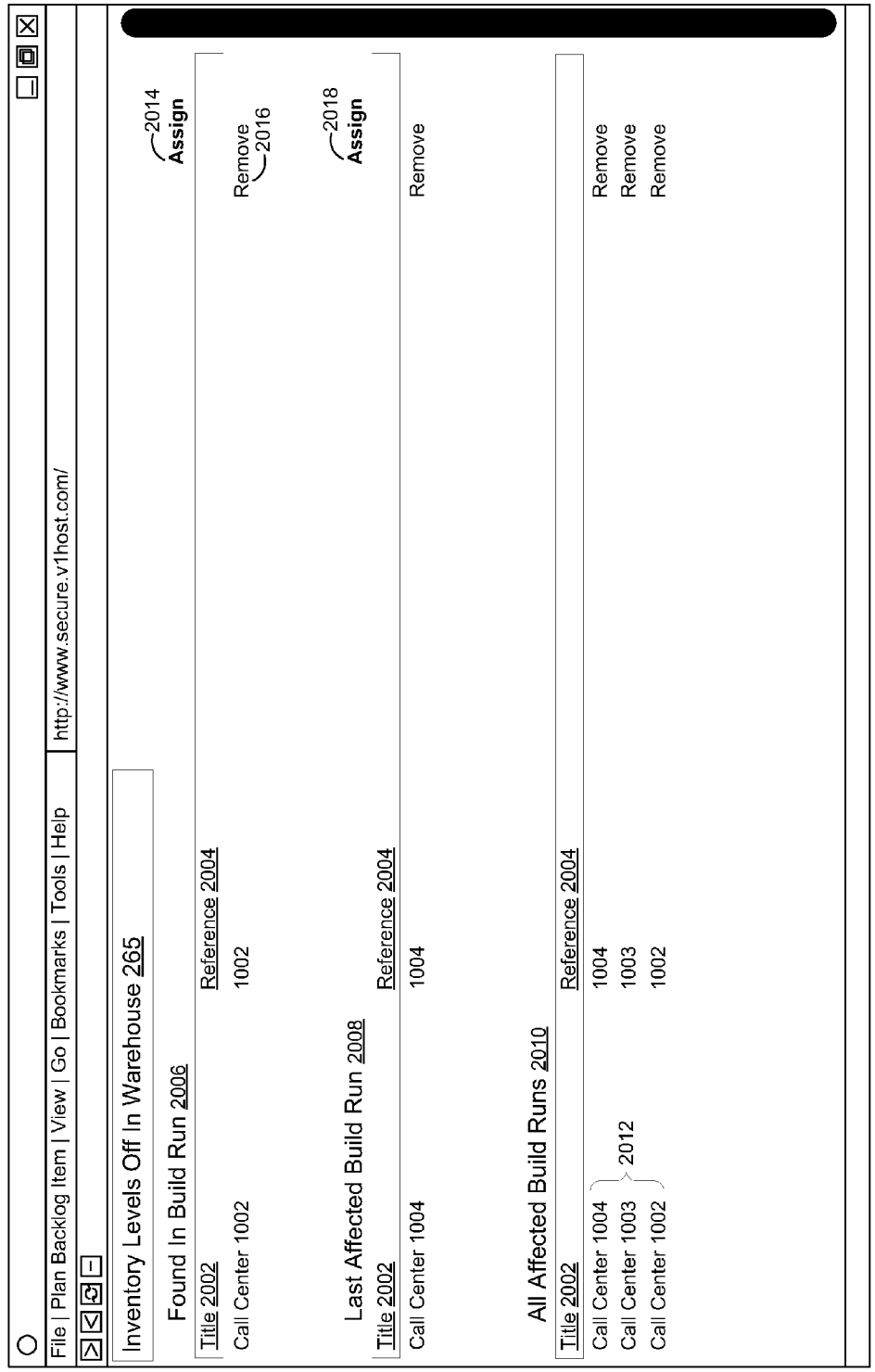
FIG. 2F is a schematic screenshot of a user interface displaying build runs associated with a selected work item in accordance with some embodiments.

In some embodiments, a user may select a particular work item and view build runs associated with the selected work item. FIG. 2F is a schematic screenshot of a user interface 2000 displaying build runs (or, more precisely, build run indicators) associated with a selected work item 265 in accordance with some embodiments. The UI 2000 is accessed by selecting a work item (e.g., by clicking on the title of the "Inventory Levels off in Warehouse" defect 265 in the UI 290, FIG. 2E) and, in some embodiments, by clicking on one or more tabs, icons, menu items, or the like. The UI 2000 displays various types of build runs associated with the defect 265, including the build run in which the defect 265 was identified (Found In Build Run 2006), the last affected build run 2008 for the defect 265, and a list 2012 of all build runs affected by the defect (All Affected Build Runs 2010). In some embodiments, affected build runs for a defect are defined to be all successive build runs from the build run in which the defect is identified through the last affected build run. In this example, the defect 265 was found in the Call Center 1002 build run and fixed in the Call Center 1004 build run. The affected build runs thus are Call Center 1002, 1003, and 1004, as displayed in the All Affected Build Runs 2010 section of the UI 2000.

A title 2002 and reference 2004 is shown for each build run displayed in the UI 2000. In some embodiments, the title 2002 combines a project name (e.g., "Call Center") with a serial number. In some embodiments, the reference 2004 is a serial number. In some embodiments, other build runs indicators (e.g., the date of the build run) may be displayed along with or included in the title 2002 and/or reference 2004.

Figure 2G:
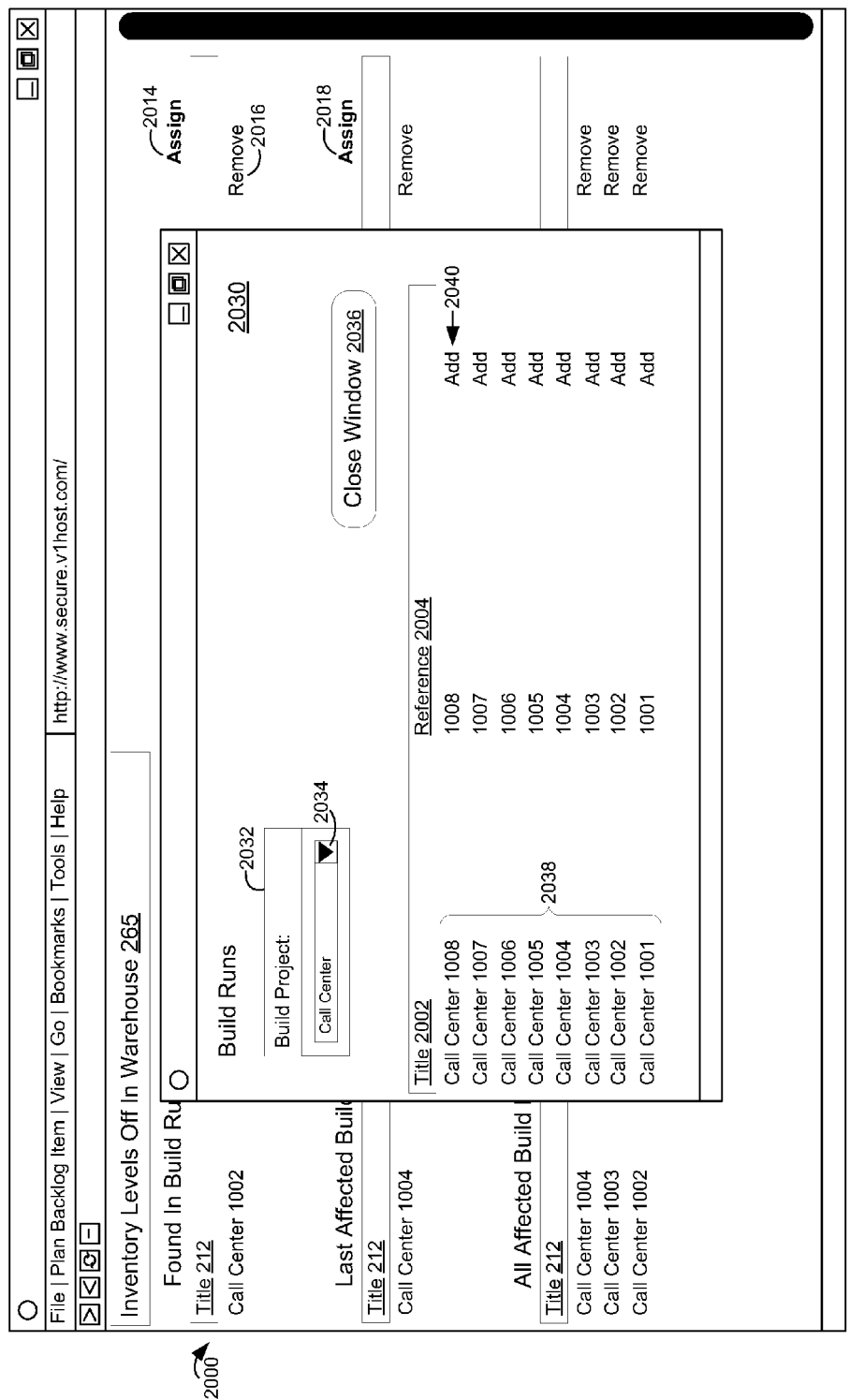
FIG. 2G is a schematic screenshot of a user interface displaying build runs available for assignment to a selected work item in accordance with some embodiments.

By selecting (e.g., clicking on) the Assign icon 2014, the user may change the build run listed under Found In Build Run 2006, or, if no build run is listed, add a build run to be displayed that indicates when the defect 265 was identified. Similarly, by selecting the Assign icon 2018, the user may change the build run listed as the Last Affected Build Run 2008. In some embodiments, for example, by default the last affected build run for a work item is defined as the most recent build run with code changes corresponding to the work item, but a user may override this default and assign the last affected build run to be a different build run, such as the build run in which the work item (e.g., the defect 265) was verified. In some embodiments, selecting the Assign icon 2014 or 2018 results in display of a UI 2030 (FIG. 2G) with a list 2038 of build runs. In FIG. 2G, the UI 2030 is displayed as superimposed on the UI 2000. A filter 2032 allows the user to filter the build runs in the list 2038 by selecting a build project (e.g., Call Center), in response to which build runs for the selected build project are displayed in the list 2038. The build project is selected, for example, using a drop-down menu 2034. The user may select a build run from the list 2038 (e.g., by clicking on the title 2002 of the build run or on a corresponding Add icon 2040). The selected build run is subsequently displayed in the UI 2000 under Found In Build Run 2006, if the UI 2030 was accessed through the Assign icon 2014, or Last Affected Build Run 2008, if the UI 2030 was accessed through the Assign icon 2018. The UI 2030 thus allows the user to specify the build run in which the defect 265 was identified or verified. If the user decides not to specify a build run, the user may select the Close Window button 2036 to return to the UI 2000 (FIG. 2F).

The term build project refers to a project associated with a discrete or deliverable software product. Not every project hierarchy node is a build project. For example, the project hierarchy node 261 is a deliverable piece of software being developed for call center operations and thus is a build project. Sub-nodes of the node 261, however, such as Team A and Team B, are not build projects.

By selecting a Remove icon 2016, the corresponding build run is removed from the UI 2000 (FIG. 2F), such that it is no longer displayed. Selecting a Remove icon 2016 thus severs the relationship between a work item and a build run (e.g., by severing a relationship 762, 764, or 776 in the object model 750, FIG. 7B).

The UI 2000 thus displays various build runs associated with the defect 265. An analogous UI (not shown) displays builds runs associated with a particular feature or with any other type of work item. For example, a UI for displaying build runs associated with a particular feature may include the lasted affected build run for the feature and/or a list of all affected build runs for the feature. In some embodiments, the list of all affected build runs for the feature includes every build run between the first build run to include changes related to the feature and the last affected build run, or alternatively, every build run that includes code changes related to the feature.

Figure 2H:
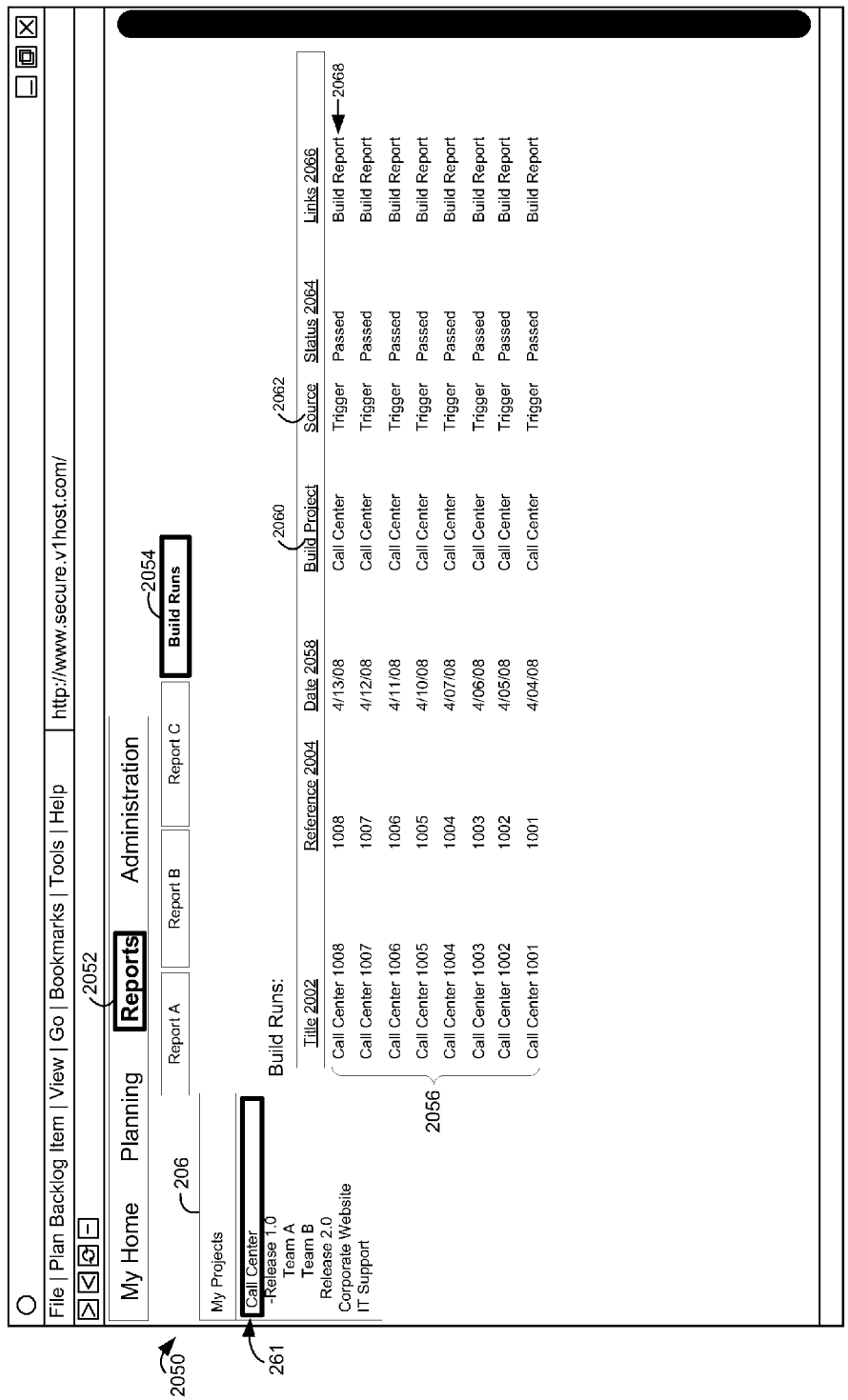
FIG. 2H is a schematic screenshot of a user interface displaying a report listing build runs in accordance with some embodiments.

In some embodiments, a group (e.g., a list) of build runs is displayed in a report. FIG. 2H is a schematic screenshot of a user interface 2050 displaying a report with a list 2056 of build runs in accordance with some embodiments. In some embodiments, the UI 2050 is accessed by selecting one or more tabs, icons, menu items, or the like (e.g., Reports tab 2052 and Build Runs tab 2054). A build project (e.g., the Call Center project hierarchy node 261) is selected; in response, a list 2056 of build runs for the selected build project is displayed. The list includes one or more identifiers and/or attributes of the build runs, including, for example, the build run title 2002, reference number 2004, date 2058 (e.g., the date the build run was generated), build project 2060, source 2062, status 2064, and links 2066. The "Build Report" link 2068 allows the user to navigate to a web page displaying a build report with information about a corresponding build run. Build reports are generated, for example, by a continuous integration server (e.g., server 306, FIGS. 3-4) responsible for generating the build run.

Figure 2I:
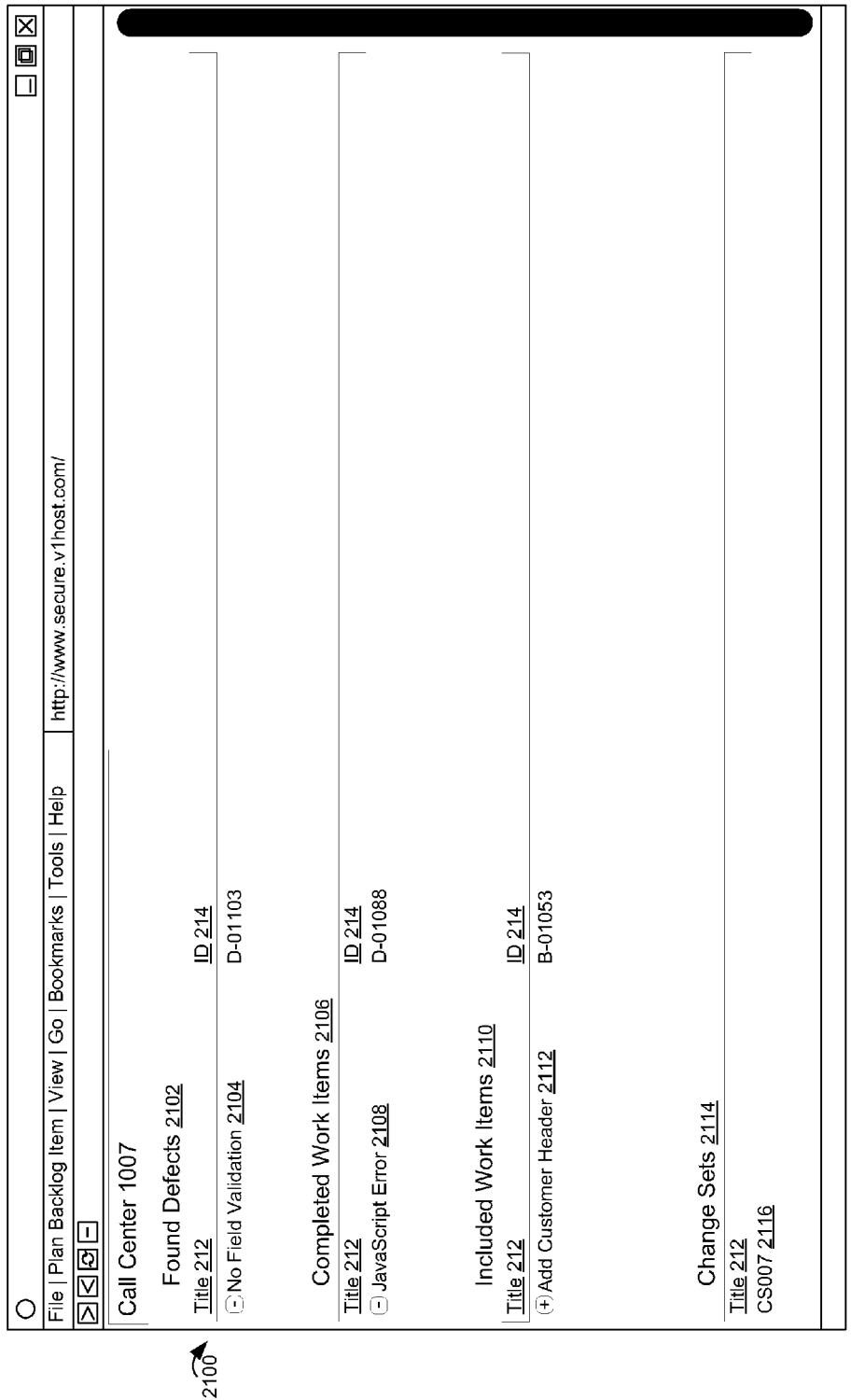
FIG. 2I is a schematic screenshot of a user interface displaying work items associated with a selected build run in accordance with some embodiments.

In some embodiments, the user may select a particular build run from the list 2056 (e.g., by clicking on a particular title 2002) and view one or more work items (e.g., every work item) associated with the selected build run. FIG. 2I is a schematic screenshot of a user interface 2100 displaying work items associated with a selected build run (Call Center 1007) in accordance with some embodiments. A defect 2104 entitled No Field Validation is listed under Found Defects 2102, indicating that the No Field Validation defect 2104 was identified in the Call Center 1007 build run. Identification of the Call Center 1007 build run as the build run in which the No Field Validation defect 2104 was found may have resulted from selecting the defect 2104 and then accessing the UI 2030 (FIG. 2G) via an Assign icon 2014 (FIG. 2F), for example. A defect 2108 entitled JavaScript Error is listed under Completed Work Items 2106, indicating that the defect 2108 was fixed in code changes introduced in the Call Center 1007 build run, or alternatively that the defect 2108 was verified in the Call Center 1007 build run. Identification of the Call Center 1007 build run as the last affected build run for the No Field Validation defect 2104 may have resulted from comments submitted with code changes (e.g., as discussed for FIG. 3, below) or from selecting the defect and then accessing the UI 2030 (FIG. 2G) via an Assign icon 2018 (FIG. 2F), for example. A feature 2112 entitled Add Customer Header is listed under Included Work Items 2110. In some embodiments, listing of the feature 2112 under Included Work Items 2110 but not under Completed Work Items 2106 indicates that code changes relating to the Call Center 1007 build run were included in the Call Center 1007 but did not fully implement the feature 2112. For example, only a portion of the functionality of the feature 2112 may have been implemented in the Call Center 1007, or the implementation of the feature 2112 in the Call Center 1007 may have included bugs. Identification of the Call Center 1007 build run as affecting the feature 2112 may have resulted from comments submitted with code changes (e.g., as discussed for FIG. 3, below), for example.

In some embodiments, the UI 2100 lists one or more change sets 2114 with code changes that affect the selected build run. The listed change set CS007 2116 thus includes code changes that affect the Call Center 1007 build run. In some embodiments, the displayed title of each change set is a link to provide access to the change set.

Figure 2J:
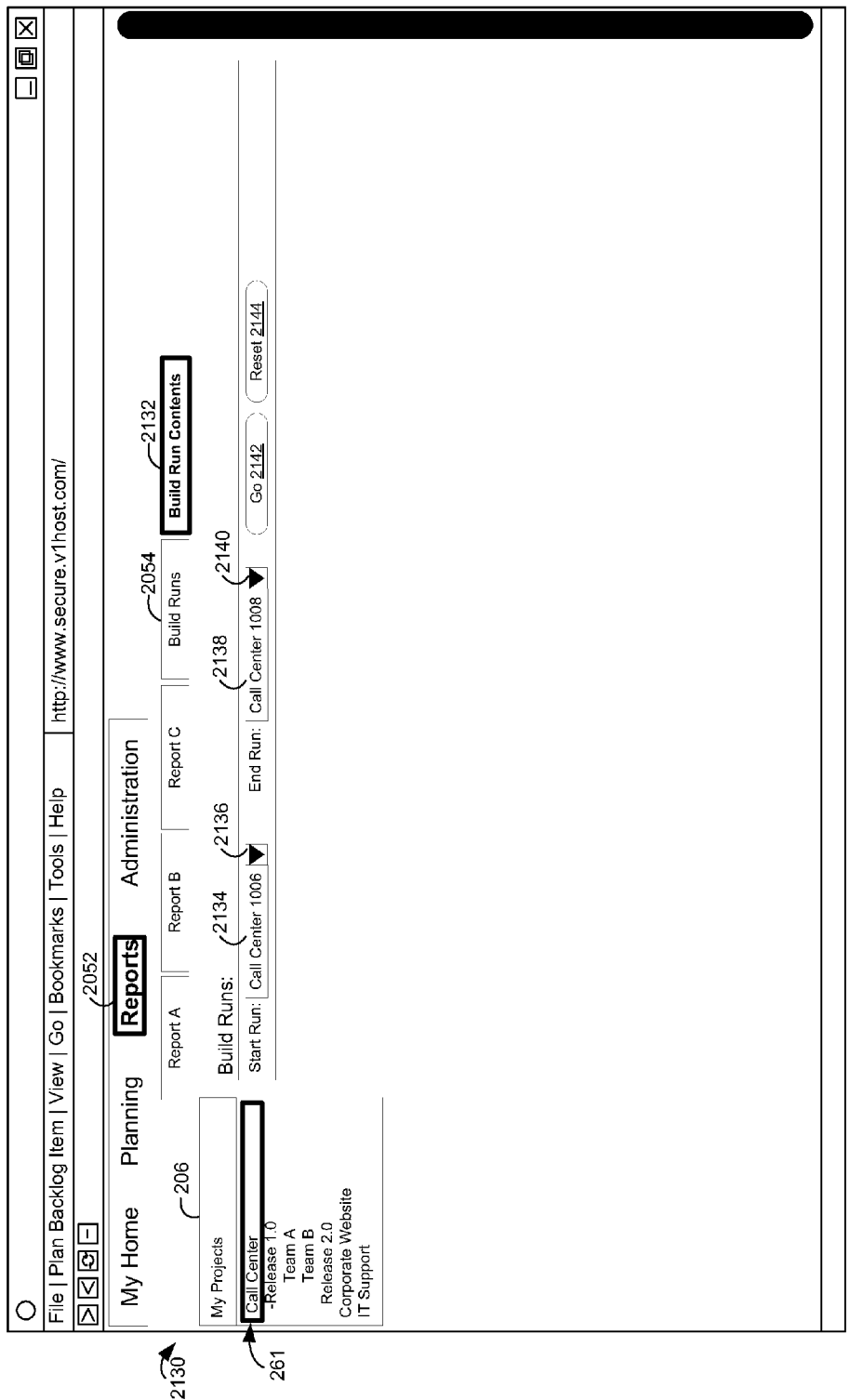
FIG. 2J is a schematic screenshot of a user interface allowing a user to specify a range of build runs in accordance with some embodiments.

In some embodiments, a user may specify a range of build runs and view one or more work items (e.g., every work item) associated with build runs in the specified range. FIG. 2J is a schematic screenshot of a user interface 2130 allowing a user to specify a range of build runs in accordance with some embodiments. In some embodiments, the UI 2130 is accessed by selecting one or more tabs, icons, menu items, or the like (e.g., Reports tab 2052 and Build Run Contents tab 2132). The user specifies the first run in the range using the Start Run user input field 2134 and the last run in the range using the End Run user input field 2138. In some embodiments, the first and last (i.e., start and end) runs are specified using icons 2136 and 2140, which provide access to a list of builds associated with a selected build project 261. Selecting the Go button 2142 results in display of the one or more work items associated with the build runs in the specified range, while selecting the Reset button 2144 resets the values in the user input fields 2134 and 2138.

Figure 2K:
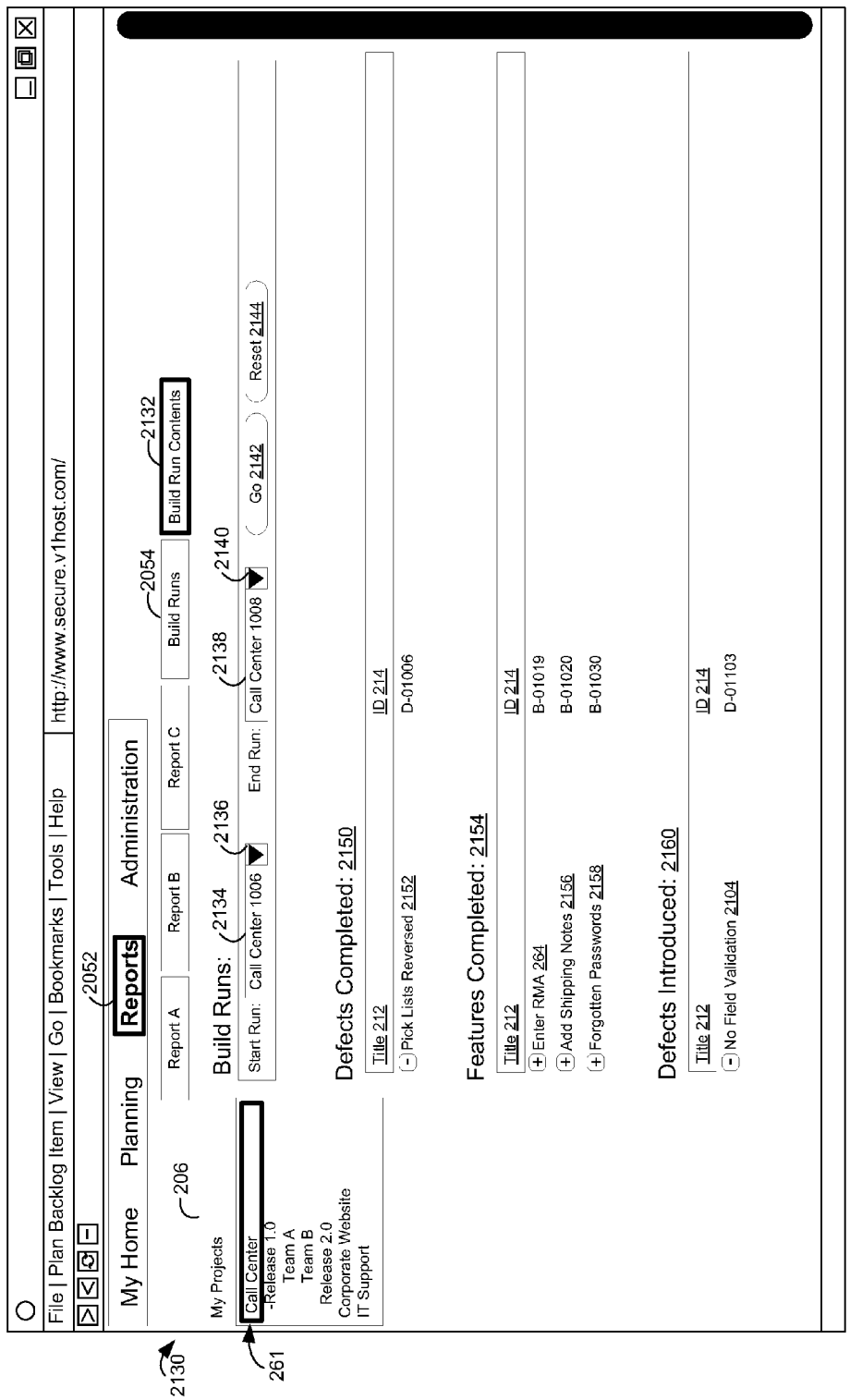
FIG. 2K is a schematic screenshot of a user interface displaying work items associated with build runs in a specified range in accordance with some embodiments.

FIG. 2K is a schematic screenshot of the user interface 2130 after a range of build runs (Call Center 1006 through 1008) has been specified: the UI 2130 now displays the one or more work items associated with the build runs in the specified range in accordance with some embodiments. Specifically, the UI 2130 lists defects completed 2150 in the specified range, features completed 2154 in the specified range, and defects introduced 2160 in the specified range. FIG. 2K thus illustrates that the Pick Lists Reversed defect 2152 was completed (e.g., fixed or verified) in the specified range, the Enter RMA 264, Add Shipping Notes 2156, and Forgotten Passwords 2158 features were completed (e.g., fixed or verified) in the specified range, and the No Field Validation defect 2104 was introduced in the specified range. In some embodiments, the UI 2130 displays other categories of work items, such as work items that affect at least one build run in the specified range.

Figure 3:
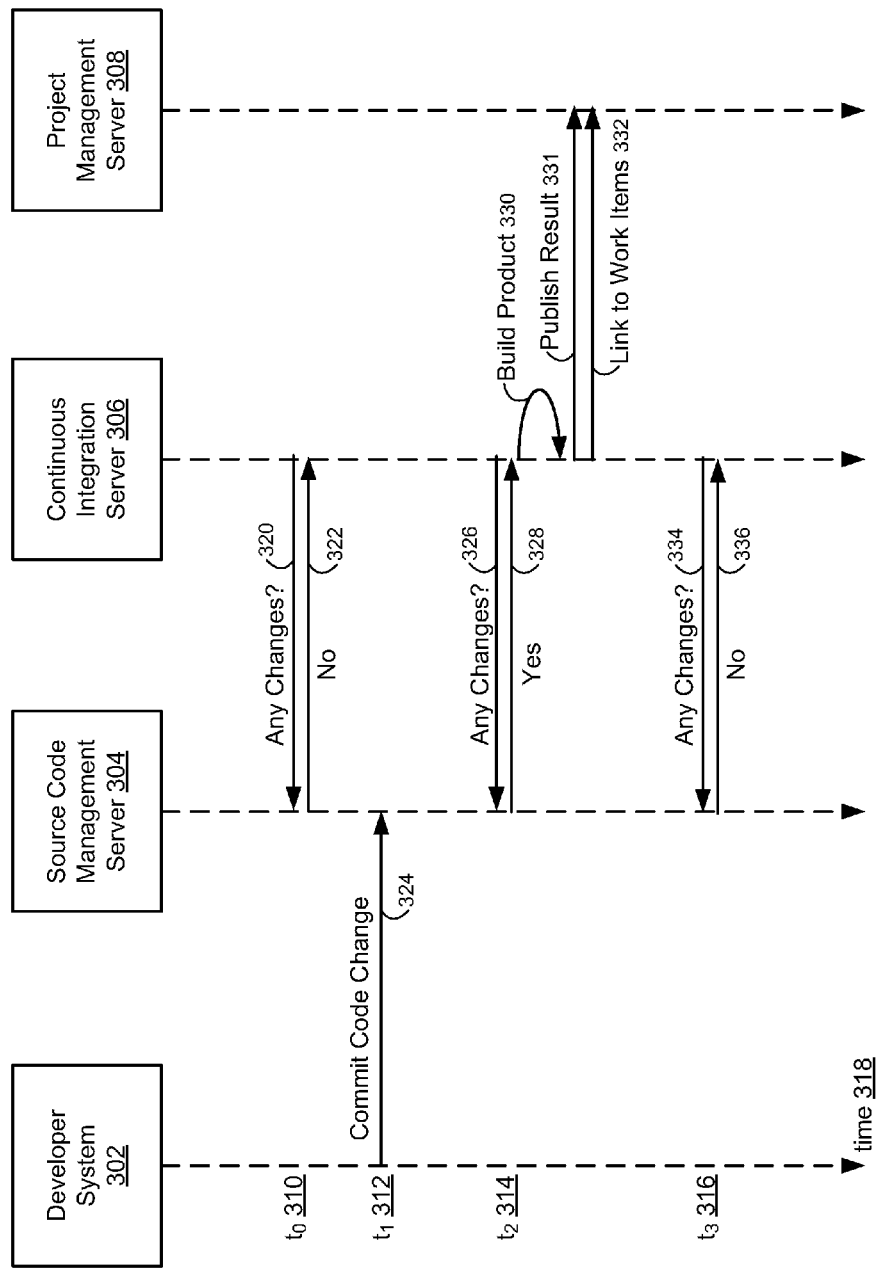
FIG. 3 is a timeline illustrating a build run generation process in accordance with some embodiments.

FIG. 3 is a timeline illustrating the build run generation process in accordance with some embodiments. FIG. 3 illustrates events involving a developer (or tester/quality engineer) system 302 (e.g., a computer used by a software developer or tester), a source code management (SCM) server 304, a continuous integration (CI) server 306, and a project management server 308, with time 318 along a vertical axis. In some embodiments, the SCM server 304 is referred to as a version control system (VCS) and the CI server 306 is referred to as a build server. The SCM server 304 is a repository of source code; developers check code into and out from the SCM server 304. The CI server 306 receives source code from the SCM server 304 and performs builds, thus generating build runs. In some embodiments, the CI server 306 periodically queries the SCM server 304 and performs resulting builds at regular intervals (e.g., daily). These queries and resulting builds may be performed automatically. Automatic generation of build runs makes a system for relating work items to build runs particularly useful, because the developer or quality engineer does not control build run generation and thus may not be aware of which build runs affect which work items. User interfaces such as those illustrated in FIGS. 2E-2K solve this problem by allowing the developer or quality engineer to track relationships between build runs and work items.

In FIG. 3, at time $t_0$ 310, the CI server 306 queries (320) the SCM server 304 as to whether the SCM server 304 has received any code changes since a previous query. The SCM server 304 responds in the negative (322) and the CI server 306 does not perform a build.

At a subsequent time $t_1$ 312, a developer at a developer system 302 commits a code change (324) to the SCM server 304. In committing this code change, the developer specifies work items affected by the code change. For example, if the code change attempts to at least partially implement a feature or fix a defect, the developer specifies the feature or defect when committing the code change. In some embodiments, the SCM server 304 provides a user interface for committing code changes that includes one or more user input fields for specifying identifiers (e.g., titles 212 or IDs 214) of work items.

At a subsequent time $t_2$ 314, the CI server 306 again queries (326) the SCM server 304 as to whether the SCM server 304 has received any code changes since the previous query 320. Because the SCM server 304 received the code change 324, it responds affirmatively (328) and provides the updated code to the CI server 306 along with the specified work items affected by the code change. In response, the CI server 306 uses the code change 324 to perform (330) a build (i.e., it builds the software product), thus generating a build run. The CI server 306 publishes (331) the build run results to the project management server (308). The CI server 306 may publish a web site displaying information about the build, accessible for example through the Build Report link 2068 (FIG. 2H). In addition, the CI server 306 provides the work item information and a build run identifier to the project management server 308, which updates its database of information regarding the software product being developed ("Link to Build Run" 332). An object model 750 of this database is described below with regard to FIG. 7B.

At a subsequent time $t_3$ 316, the CI server 306 queries (334) the SCM server 304 as to whether the SCM server 304 has received any code changes since the previous query 326. The SCM server 304 responds in the negative (336) and the CI server 306 does not perform a build.

Figure 4:
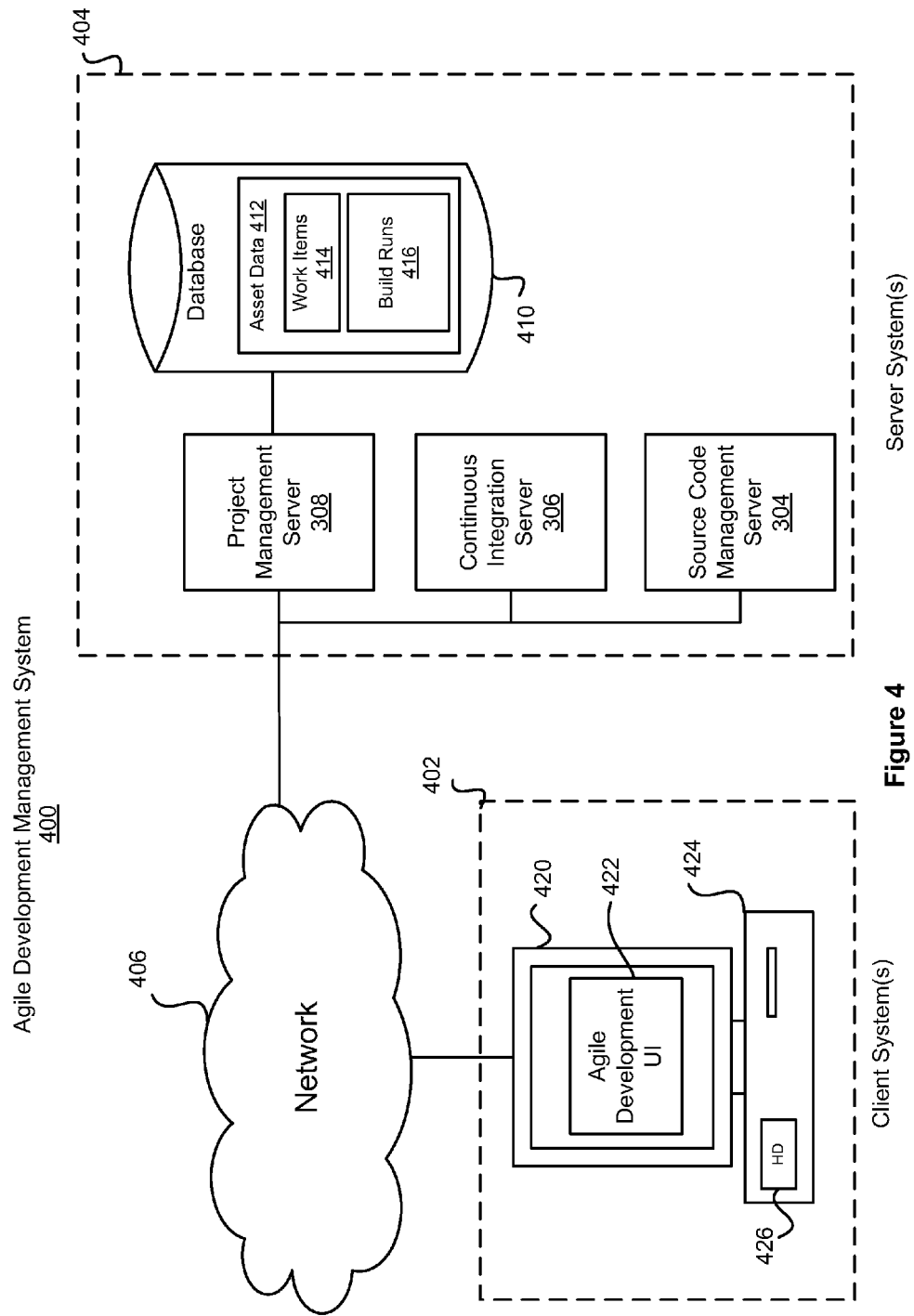
FIG. 4 is a block diagram illustrating an agile development management system in accordance with some embodiments.

FIG. 4 is a block diagram illustrating an agile development management system 400 in accordance with some embodiments. The agile development management system 400 includes a server system 404 coupled to one or more client systems 402 by a network 406. The client systems 402 may include client systems associated with respective users such as software developers, testers, managers, clients, customers, vendors, and any other parties involved in agile software development. In some embodiments, the client systems 402 are examples of developer systems 302 (FIG. 3). The network 406 may be any suitable wired and/or wireless network and may include a local area network (LAN), wide area network (WAN), virtual private network (VPN), the Internet, metropolitan area network (MAN), or any combination of such networks. While FIG. 4 is described as an agile development management system, similar systems may be implemented for other types of software development project management.

The server system 404 includes a project management server 308 and a database 410. The server 308 serves as a front-end for the server system 404. The server 308 provides an interface between the server system 404 and the client systems 402. The server system 404 also includes a CI server 306 and SCM server 304, as described above with regard to FIG. 3. In some embodiments, the functions of servers 304, 306, and/or 308 may be divided or allocated among multiple servers or implemented on a single server.

Figure 7A:
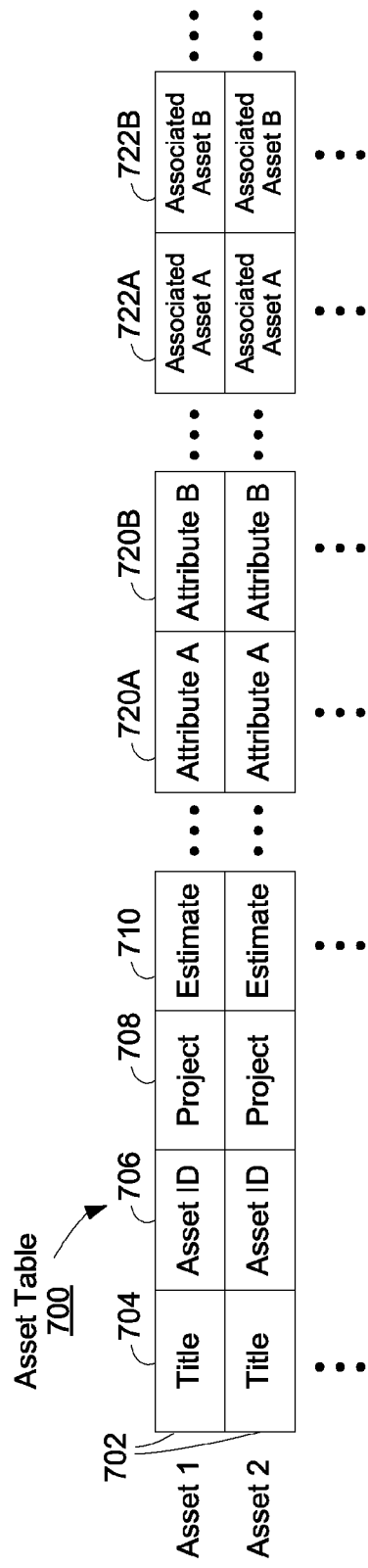
FIG. 7A is a diagram illustrating a data structure for assets in accordance with some embodiments.

The server system 404 stores data relating to the agile development process, including asset data 412. The asset data 412 includes attributes for respective assets. An exemplary data structure 700 for asset data 412 is illustrated in FIG. 7A, described below. The asset data 412 includes work item data 414 and build run data 416.

A user interfaces with the server system 404 at a client system or device 402 (hereinafter called the client system for ease of reference). The client system 402 includes a computer 424 or computer controlled device, such as a personal digital assistant (PDA), cellular telephone or the like. The computer 424 typically includes one or more processors (not shown); memory, which may include volatile memory (not shown) and non-volatile memory such as a hard disk drive 426; and a display 420. The computer 424 may also have input devices such as a keyboard and a mouse (not shown).

In some embodiments, a user may interact with the server system 404 via an agile development user interface 422 presented on the display 420. Examples of user interfaces 422 are illustrated in FIGS. 2A-2K. In some embodiments, the agile development user interface 422 may be a web-based user interface. That is, the user interface 422 may include one or more web pages. It is noted that a single web page can contain multiple frames, each of which may appear (when displayed by a browser application) to be a distinct web page. The web page(s) may be written in the Hypertext Markup Language (HTML), Extensible Markup Language (XML), or any other suitable language for preparing web pages, and may include one or more scripts for interfacing with the server system 404. For example, the web page(s) may include a JavaScript application that interfaces with the server system 404 via an application programming interface (API). The JavaScript application receives asset data and reporting data from the server system 404, manages the rendering of that data at the client, and also performs the client-side aspects of other tasks, such as receiving user input associating work items with build runs, updating attribute values according to data entered in user input fields, and transmitting user requests to the server system 404.

In some other embodiments, the agile development user interface 422 may be a part of a stand-alone application that is run on the client system 402. The standalone application may interface with the server system 404 via an application programming interface (API).

The agile development management system 400 may perform the methods 800 (FIG. 8A) and 850 (FIG. 8B) in accordance with some embodiments. In some embodiments, performance of various operations in the methods 800 and 850 is divided between the client system 402 and server system 404. In some embodiments, the methods 800 and 850 are performed entirely by the server system 404.

Instead of using a client-sever model, project management software (e.g., agile development management software) may be installed and used on a single computer system combining the functionalities of the server system 404 and client system 402. For example, the methods 800 (FIG. 8A) and 850 (FIG. 8B) may be performed entirely on a single computer system.

Figure 5:
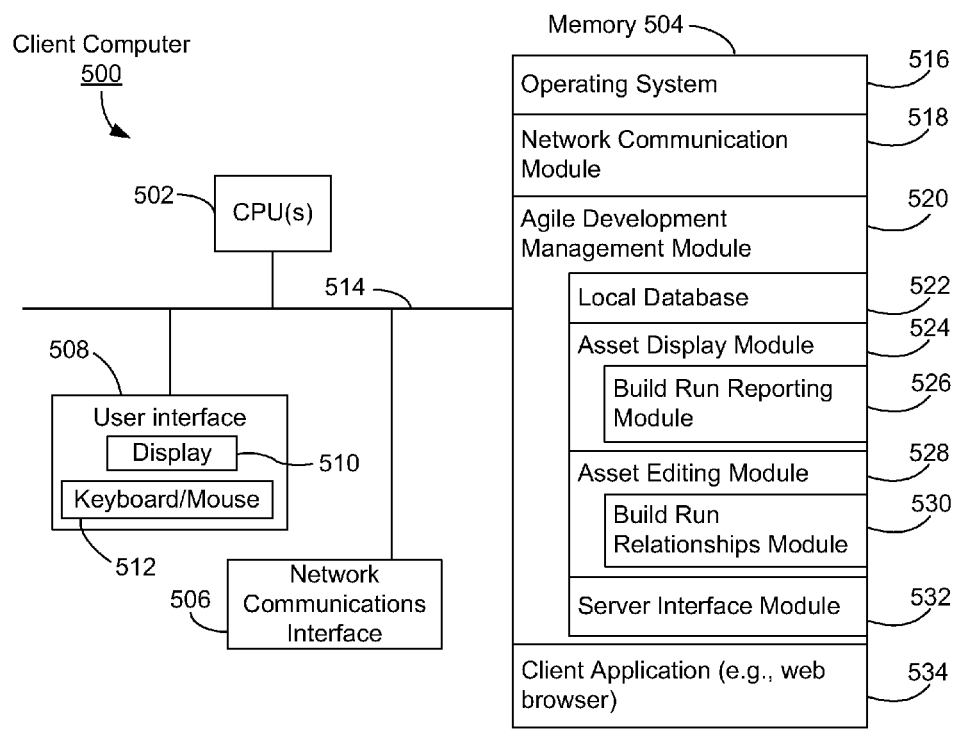
FIG. 5 is a block diagram illustrating a client computer in accordance with some embodiments.

FIG. 5 is a block diagram illustrating a client computer 500 in accordance with some embodiments. The client computer 500, which may be used as a client system 402 (FIG. 4) (e.g. a developer or tester system 302, FIG. 3), typically includes one or more processing units (CPUs) 502, one or more network or other communications interfaces 506, memory 504, and one or more communication buses 514 for interconnecting these components. The communication buses 514 may include circuitry (sometimes called a chipset) that interconnects and controls communications between system components. The client computer 500 may also include user interface hardware 508 comprising a display device 510 and a keyboard and/or mouse (or other selection device) 512. Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. Memory 504, or alternately non-volatile memory device(s) within memory 504, comprises a computer readable storage medium. In some embodiments, memory 504 stores the following programs, modules, and data structures, or a subset thereof:

- an operating system 516 that includes procedures for handling various basic system services and for performing hardware dependent tasks;
- a network communication module 518 that is used for connecting the client computer 500 to other computers via the one or more communication network interfaces 506 and one or more communication networks, such as the Internet, other wide area networks, local area networks, metropolitan area networks, and so on;
- an agile development management module 520 for handling data relating to the agile development process; and
- a client application 534, such as a web browser.

In some embodiments, the agile development management module 520 includes a local database 522 for storing data sent by the server (e.g., asset data, which includes work item and build run data), an asset display module 524 for displaying assets (e.g., via the user interfaces of FIGS. 2A-2K), an asset editing module 528 for updating attribute values (e.g., in accordance with data entered via user input fields), and a server interface module 532 for interfacing with server computer 500. The asset display module 524 includes a build run reporting module 526 for displaying build runs and their relationships to work items (e.g., via the user interfaces of FIGS. 2E-2K). The asset editing module 528 includes a build run relationships module 530 for creating and editing relationships between work items and build runs (e.g., via UIs 2000 and 2030, FIGS. 2F and 2G). In some embodiments, the build run reporting module 526 and build run relationships module 530 correspond to instructions for performing all or a portion of the operations in the methods 800 (FIG. 8A) and 850 (FIG. 8B). In some embodiments, the server interface module 530 includes a cache for storing data to be transmitted to the server.

In some embodiments, the agile development management module 520 may be a script-based module, embedded in a web page served from the server system 404 (FIG. 4). The web page may be rendered by a client application 534, such as a web browser, at the client computer 500. When the web page is rendered, the agile development management module 520 is executed, thereby providing a web-based interface to the server system 404. The script-based agile development management module may be written in JavaScript, AJAX, ECMAScript, Perl, or any other suitable scripting language.

In some other embodiments, the agile development management module 520 may be a standalone application stored in memory 504 of the client computer 500.

In some embodiments, the agile development management module 520 is replaced with a more general project management module that is not specific to agile software development.

Each of the above identified elements in FIG. 5 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 504 may store a subset of the modules and data structures identified above. Furthermore, memory 504 may store additional modules and data structures not described above.

Figure 6:
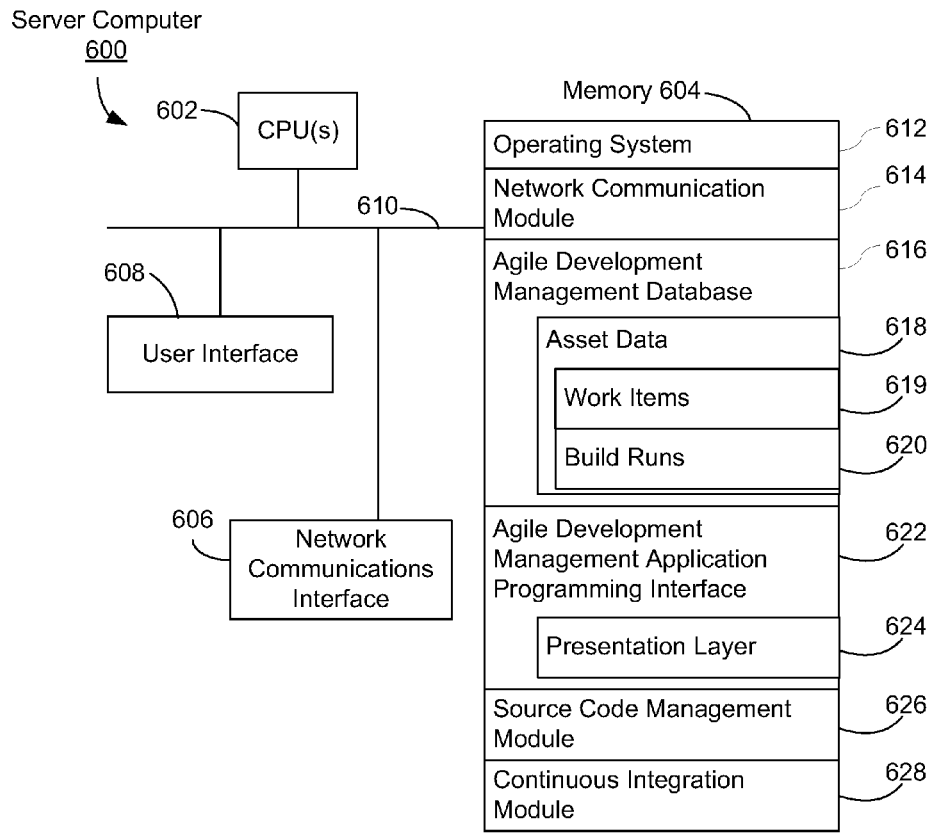
FIG. 6 is a block diagram illustrating a server computer in accordance with some embodiments.

FIG. 6 is a block diagram illustrating a server computer 600 in accordance with some embodiments. The server computer 600, which may be used as a server system 404 (FIG. 4), typically includes one or more processing units (CPUs) 602, one or more network or other communications interfaces 606, memory 604, and one or more communication buses 610 for interconnecting these components. The communication buses 610 may include circuitry (sometimes called a chipset) that interconnects and controls communications between system components. The server system 600 optionally may include user interface hardware 608, which may include a display device (not shown), and a keyboard and/or a mouse (not shown). Memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 604 may optionally include one or more storage devices remotely located from the CPU(s) 602. Memory 604, or alternately non-volatile memory device(s) within memory 604, comprises a computer readable storage medium. In some embodiments, memory 604 stores the following programs, modules and data structures, or a subset thereof:

- an operating system 612 that includes procedures for handling various basic system services and for performing hardware dependent tasks;
- a network communication module 614 that is used for connecting the server system 600 to other computers via the one or more communication network interfaces 606 and one or more communication networks, such as the Internet, other wide area networks, local area networks, metropolitan area networks, and so on;
- an agile development management database 616, which may be used as the database 410 (FIG. 4), for storing data relating to the agile development process, including asset data 618;
- an agile development management application programming interface (API) 622 for exchanging information with the agile development management modules 520 in one or more client computers 500 (FIG. 5);
- a source code management module 626 for performing the functions of the SCM server 304 (FIGS. 3-4); and
- a continuous integration module 628 for performing the functions of the CI server 306 (FIGS. 3-4).

Figure 7B:
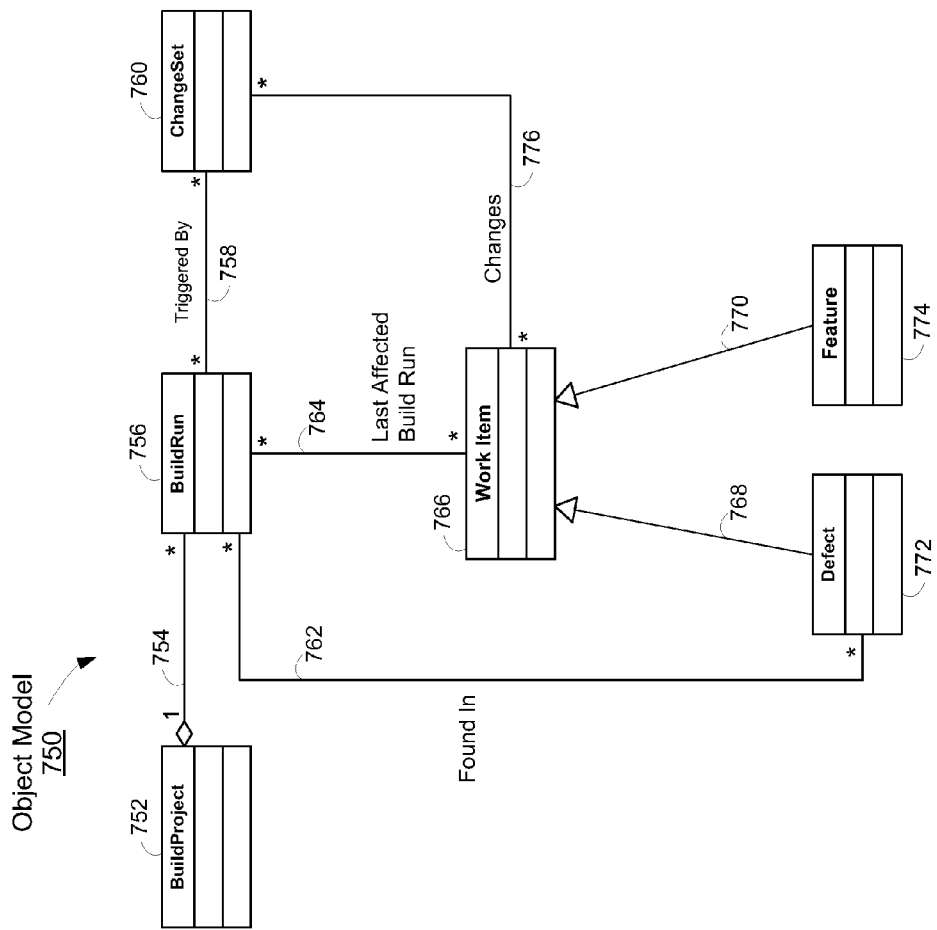
FIG. 7B is a diagram illustrating an object model for storing relationships between build runs, build projects, work items, and change sets in accordance with some embodiments.

In some embodiments, the asset data 618 includes work items 619 and build runs 620, in accordance with the database 410 (FIG. 4). In some embodiments, the agile development management database 616 is organized in accordance with the object model 750 (FIG. 7B). In some embodiments, the agile development management database 616 includes database management software for performing one or more operations of the methods 800 (FIG. 8A) and 850 (FIG. 8B). In some embodiments, the application interface 622 includes a presentation layer 624 for rendering user interfaces (e.g., FIGS. 2A-2K) accessed by a client system 402.

In some embodiments, the agile development management database 616 is replaced with a more general project management database that is not specific to agile software development. In some embodiments, the agile development management application interface 622 is replaced with a more general API that is not specific to agile software development.

Each of the above identified elements in FIG. 6 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 604 may store a subset of the modules and data structures identified above. Furthermore, memory 604 may store additional modules and data structures not described above.

Although FIG. 6 shows a "server computer," FIG. 6 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers.

The agile development management database 616 stores data in various tables. For example, an "Asset Type" table includes an entry for each kind of asset, such as goal, feature group, feature, defect, task, or test. An "Attribute Definition" table defines the attributes associated with each kind of asset listed in the "Asset Type" table. A "Synthetic Attribute" table references formulas used to calculate synthetic attributes. For example, if a work estimate or degree of completion is defined as a roll-up of estimates or degrees of completion for other assets, the roll-up may be specified in a Synthetic Attribute table. An "Attribute Security Check" table contains references to operations used to determine whether a user may access or modify particular attributes. For attributes that are associated assets, a "Relation Definition" table defines relationships between assets. In addition, a "Many to Many Relation Definition" table may contain relationship information for assets in many-to-many relationship with other assets. Other tables may specify business rules for various assets.

Attribute values for particular assets are stored in asset tables 700, as illustrated in FIG. 7A in accordance with some embodiments. For example, the database 616 (FIG. 6) includes asset tables 700. While the asset table 700 of FIG. 7A is illustrated as a single table, it may be implemented in accordance with an object model relating multiple tables (including, for example, "Asset Type," "Attribute Definition," "Synthetic Attribute," and "Relation Definition" tables). In some embodiments, a table 700 corresponds to a particular type of asset, such as feature group, feature, defect, task, or test. The asset table 700 includes a row 702 for each respective asset stored in the table. Each row includes fields that contain values for attributes of the respective asset, as defined in the "Attribute Definition" table. For example, the attribute fields may include title 704, asset ID 706, project 708, estimate 710, and various other attributes 720. The asset table 700 also includes fields 722 to specify attributes that are associated (i.e., related) assets. For example, if a respective asset is a feature or defect, fields 722 may specify tasks and tests associated with the feature or defect, for example by providing the asset IDs of the tasks and tests. If a respective asset is a work items, fields 722 may specify builds runs associated with (e.g., affected by) the work item. In another example, a field 722 may specify an iteration to which an asset is assigned.

In some embodiments, an asset table 700 for work items stores multiple versions of respective work items, wherein each version of a respective work item has a distinct work estimate value. The version is specified, for example, in a version field.

The tables 700 thus include information to allow the agile development management API 622 to respond to a request from a client computer 500 when a user seeks to create, display, and modify assets or to access information regarding assets. The interface 622 can access the asset tables 700 (e.g., by writing to or querying the tables 700) in response to requests from the client computer 500.

FIG. 7B illustrates a data structure, referred to as an object model 750, for storing relationships between build runs, build projects, work items, and change sets in accordance with some embodiments. In some embodiments, tables associated with the object model 750 are stored in the database 616 (FIG. 6). In the object model 750, build projects 752 are in a one-to-many relationship 754 with build runs 756 ("many" is indicated by the star symbol "*" in FIG. 7B), because a new build run for a particular project is generated each time the CI server 306 (FIG. 3) performs a build. As illustrated in FIG. 3, build runs are triggered (e.g., automatically) by code changes. A group of code changes is referred to as a change set. Build runs 756 are in a many-to-many relationship 758 with change sets 760, because each build run may contain multiple change sets and a specific change set may appear in many build runs.

A last affected build run relationship 764 between work items 766 and build runs 756 is navigated to determine the last affected build run for a work item. Because a particular build run may complete multiple work items, and because fixes may be back-ported to older releases, the relationship 764 is a many-to-many relationship. The CI server 306 thus is used to ensure that only one last affected build run 756 for a given build project 752 exists in the relationship 764.

In some embodiments, work items 766 include defects 772 and features 774, as indicated by the relationships 768 and 770 respectively. A found-in relationship 762 indicates the build run 756 in which a particular defect 772 was introduced or identified. Because multiple defects can be introduced or identified in a particular build run and defects may exist in build runs representing different product releases, the relationship 762 is many-to-many, and the CI server 306 is used to ensure that, for a given build project 752, only one found-in build run for a given defect exists in the relationship 762.

A changes relationship 776 indicates which change sets 760 include code changes for particular work items 766. Because a single change set may affect multiple work items and multiple change sets might be needed to deliver full functionality for a work item, the relationship 776 is many-to-many. The relationships 776 and 758 may be navigated to identify all build runs that contain changes for a particular work item.

In some embodiments, the object model 750 includes additional relationships that map work items to related work items. For example, tasks and tests are mapped to their corresponding features and defects, and features are mapped to their corresponding feature groups. Such relationships may allow a user to select a work item of a particular type and to view build runs associated with a related work item.

Figure 8A:
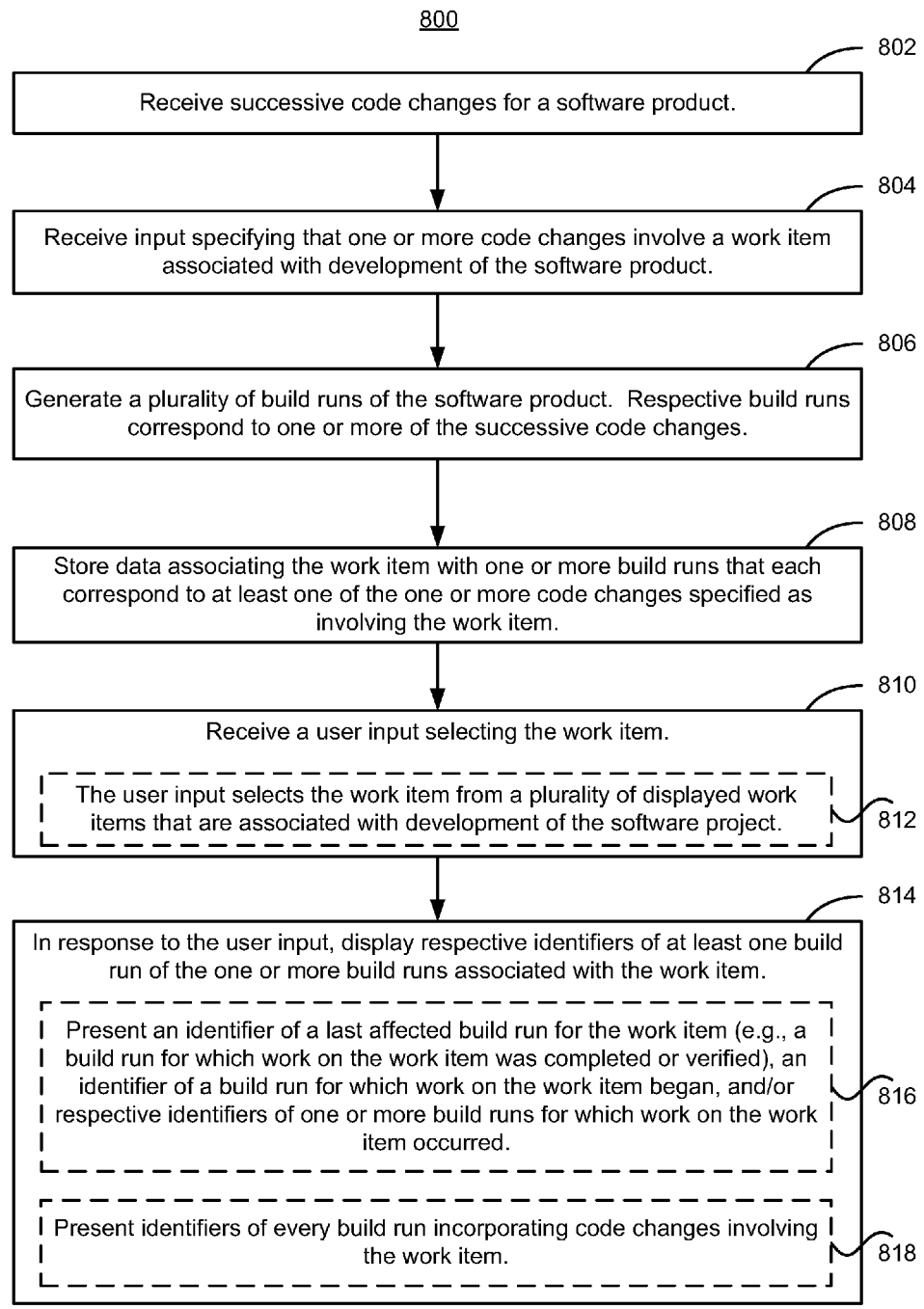
FIGS. 8A-8B are flow diagrams illustrating methods of developing software in accordance with some embodiments.
Figure 8B:
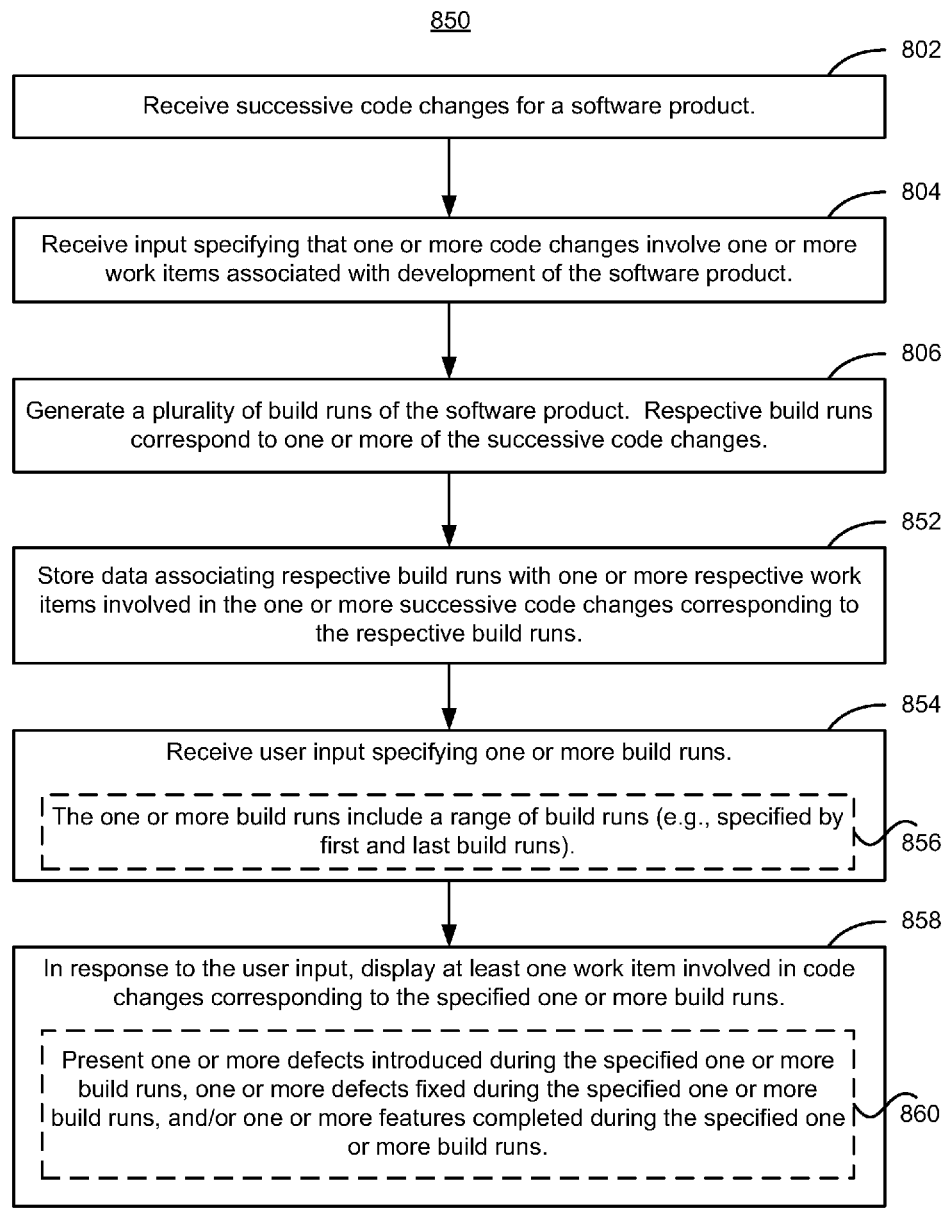

FIG. 8A is a flow diagram illustrating a method 800 of displaying (or providing for display) indicators of build runs associated with a work item in accordance with some embodiments. In some embodiments, the method 800 is performed using an agile development management system 400 (FIG. 4) or another type of software development management system. In some embodiments, operations of the method 800 are divided between a server system 404 and client system 402 (FIG. 4). Alternatively, the method 800 is performed entirely at a server system 404.

In the method 800, successive code changes for a software product are received (802). In addition, input is received (804) specifying that one or more code changes involve a work item associated with development of the software product. For example, the code changes and input specifying a work item are received at an SCM server 304 (FIG. 3) during a commit code change operation 324.

A plurality of build runs of the software product is generated (806) (e.g., by a CI server 306, FIG. 3). Respective build runs correspond to one or more of the successive code changes.

Data is stored (808) associating the work item with one or more build runs that each correspond to at least one of the one or more code changes specified as involving the work item. For example, the data is stored in a database 410 (FIG. 4) in accordance with the object model 750 (FIG. 7B).

A user input selecting the work item is received (810). In some embodiments, a plurality of work items associated with development of the software project is displayed (e.g., in the group 292, FIG. 2E) and the user input selects (812) the work item (e.g., defect 265, FIG. 2E) from the plurality of displayed work items.

In response to the user input, respective identifiers of at least one build run of the one or more build runs associated with the work item are displayed (814). In some embodiments, an identifier of a last affected build run for the work item (e.g., a build run for which work on the work item was completed or verified), an identifier of a build run for which work on the work item began, and/or respective identifiers of one or more build runs for which work on the work item occurred are presented (i.e., displayed) (816). In some embodiments, identifiers of every build run incorporating code changes involving the work item are presented (818).

In some embodiments, the respective identifiers include dates (e.g., dates the respective build runs were generated). In some embodiments, the respective identifiers include distinct numbers (e.g., serial numbers in a title 2002 or reference 2004, FIG. 2F).

In some embodiments, the work item is a defect (e.g., defect 265, FIG. 2F) and the displaying of operation 814 includes presenting an identifier of a last build run affected by the defect (e.g., Last Affected Build Run 2008, FIG. 2F), presenting respective identifiers of every build run incorporating code changes involving the defect (e.g., All Affected Build Runs 2010, FIG. 2F), and/or presenting an identifier of a build run in which the defect was found (e.g., Found In Build Run 2006, FIG. 2F).

In some embodiments, the work item is a defect and the method 800 further includes receiving a user input specifying a build run in which the defect was found (e.g., via the Assign icon 2014 and the UI 2030, FIGS. 2F-2G), storing data associating the build run in which the defect was found with the defect (e.g., via the relationship 762, FIG. 7B), and displaying an identifier of the build run in which the defect was found (e.g., a title 2002 or reference 2004 of a build run in the Found In Build Run category 2006, FIG. 2F).

In some embodiments, the work item is a feature or defect having an associated task or test, and the displaying of operation 814 includes presenting respective identifiers of one or more build runs incorporating code changes involving the associated task or test.

In some embodiments, the work item is a feature group (e.g., an epic or theme) comprising an associated feature and the displaying of operation 814 includes presenting respective identifiers of one or more build runs having code changes involving the associated feature.

In some embodiments, the method 800 further includes receiving a user input to change the last affected build run for the work item (e.g., via the Assign icon 2018 and the UI 2030, FIGS. 2F-2G). In response to the user input to change the last affected build run for the work item, the last affected build run for the work item is updated (e.g., in the relationship 764, FIG. 7B). An identifier of the updated last affected build run for the work item is displayed (e.g., a title 2002 or reference 2004 of a build run in the Last Affected Build Run category 2008, FIG. 2F).

While the method 800 includes a number of operations that appear to occur in a specific order, it should be apparent that the method 800 can include more or fewer operations, which can be executed serially or in parallel. An order of two or more operations may be changed and/or two or more operations may be combined into a single operation. For each operation in which information is displayed, the information alternately may be provided by a server to a client for display.

FIG. 8B is a flow diagram illustrating a method 850 of displaying (or providing for display) work items associated with one or more build runs in accordance with some embodiments. In some embodiments, the method 850 is performed using an agile development management system 400 (FIG. 4) or another type of software development management system. In some embodiments, operations of the method 850 are divided between a server system 404 and client system 402 (FIG. 4). Alternatively, the method 850 is performed entirely at a server system 404.

In the method 850, the operations 802, 804, and 806 are performed as described above for the method 800 (FIG. 8A). In addition, data is stored (852) associating respective build runs with one or more respective work items involved in the one or more successive code changes corresponding to the respective build runs. For example, the data is stored in a database 410 (FIG. 4) in accordance with the object model 750 (FIG. 7B).

User input is received (854) specifying one or more build runs. For example, the user selects a build run (e.g., Call Center 1007) in the group 2056 (FIG. 2H). In some embodiments, the one or more build runs include a range of build runs, which are specified, for example, by first and last build runs (e.g., via the user input fields 2134 and 2138, FIG. 2J).

In response to the user input, at least one work item involved in code changes corresponding to the specified one or more build runs is displayed (858). In some embodiments, one or more defects introduced during the specified one or more build runs (e.g., Found Defects 2102, FIG. 2I, or Defects Introduced 2160, FIG. 2K), one or more defects fixed during the specified one or more build runs (e.g., Completed Work Items 2106, FIG. 2I, or Defects Completed 2150, FIG. 2K), and/or one or more features completed during the specified one or more build runs (e.g., Features Completed 2154, FIG. 2K) are presented (i.e., displayed) (860).

In some embodiments, the method 850 further includes, in response to the user input of the operation 854, providing (e.g., displaying a link to) a change set (e.g., CS007 2116, FIG. 2I) associated with a respective build run of the specified one or more build runs.

While the method 850 includes a number of operations that appear to occur in a specific order, it should be apparent that the method 850 can include more or fewer operations, which can be executed serially or in parallel. An order of two or more operations may be changed and/or two or more operations may be combined into a single operation. For each operation in which information is displayed, the information alternately may be provided by a server to a client for display.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A method of developing software, the method comprising:
obtaining a plurality of code changes for a software product;
identifying the plurality of code change as affecting a work item of a software product under development, wherein the work item specifies a feature to be added to the software product or a defect to be removed from the software product;
generating (i) a plurality of build runs of the software product, respective build runs corresponding to one or more code changes in the plurality of code changes; and (ii) data associating the work item with one or more build runs that each correspond to at least one of the one or more code changes specified as involving the work item;
obtaining a user input selecting the work item; and
in response to the user input,
causing respective identifiers of at least one build run of the one or more build runs associated with the work item to be displayed to a user, including causing an identifier of the at least one build run to be displayed to the user.

2. The method of claim 1, wherein the at least one build run is one of: a last affected build run for the work item, a build run for which work on the work item has begun, a build run for which work on the work item occurred, a build run for which work on the work item was completed.

3. The method of claim 1, further comprising: responsive to the user input selecting the work item, causing information representing one or more of the following to be displayed to the user:
defects introduced during the range of build runs;
defects fixed during the range of build runs; and
features completed during the range of build runs.

4. The method of claim 1, further comprising:
causing a plurality of work items associated with development of the software product to be displayed to a user; and
wherein the user input selects the work item from the plurality of displayed work items.

5. The method of claim 1, including:
causing an identifier of a last affected build run for the work item to be displayed to a user.

6. The method of claim 5, further comprising:
responsive to a user input to change the last affected build run for the work item,
updating the last affected build run for the work item; and
causing an identifier of the updated last affected build run for the work item to be displayed to the user.

7. The method of claim 1, wherein causing respective identifiers of the at least one build run of the one or more build runs associated with the work item to be displayed to a user comprises:
causing respective identifiers of one or more build runs for which work on the work item occurred to be displayed to the user.

8. The method of claim 1, wherein displaying respective identifiers of the at least one build run of the one or more build runs associated with the work item comprises:
causing an identifier of a build run for which work on the work item was completed to be displayed to a user.

9. The method of claim 1, wherein displaying respective identifiers of the at least one build run of the one or more build runs associated with the work item comprises:
causing an identifier of a build run for which work on the work item was verified to be displayed to a user.

10. The method of claim 1, wherein displaying respective identifiers of the at least one build run of the one or more build runs associated with the work item comprises:
causing identifiers of every build run incorporating code changes involving the work item to be displayed to a user.

11. The method of claim 1, wherein:
the work item is a defect; and
causing respective identifiers of the at least one build run of the one or more build runs associated with the work item to be displayed to a user comprises:
causing an identifier of a last build run affected by the defect to be displayed to the user; and
causing respective identifiers of every build run incorporating code changes involving the defect to be displayed to a user.

12. The method of claim 1, wherein:
the work item is a defect; and
causing respective identifiers of the at least one build run of the one or more build runs associated with the work item to be displayed to a user comprises:
causing an identifier of a build run in which the defect was found to be displayed to the user.

13. The method of claim 1, wherein the work item is a defect, the method further comprising:
obtaining a user input specifying a build run in which the defect was found;
storing data associating the build run in which the defect was found with the defect; and
causing an identifier of the build run in which the defect was found to be displayed to a user.

14. The method of claim 1, wherein:
the work item is a feature or defect having an associated task or test; and
causing respective identifiers of the at least one build run of the one or more build runs associated with the work item to be displayed to a user comprises:
causing respective identifiers of one or more build runs incorporating code changes involving the associated task or test to be displayed to the user.

15. The method of claim 1, wherein:
the work item is a feature group comprising an associated feature; and
causing respective identifiers of the at least one build run of the one or more build runs associated with the work item to be displayed to a user comprises:
causing respective identifiers of one or more build runs having code changes involving the associated feature to be displayed to the user.

16. The method of claim 1, wherein the respective build runs corresponding to the one or more code changes have respective identifiers comprise distinct numbers.

17. The method of claim 1, wherein the respective build runs corresponding to the one or more code changes have respective identifiers comprise dates.

18. A system for developing software, the system comprising:
memory;
one or more processors; and one or more programs stored in the memory and comprise instructions, which when executed by the one or more processors, cause the system to:
    obtaining a plurality of code changes for a software product;
    identifying the plurality of code change as affecting a work item of a software product under development, wherein the work item specifies a feature to be added to the software product or a defect to be removed from the software product;
    generating (i) a plurality of build runs of the software product, respective build runs corresponding to one or more code changes in the plurality of code changes; and (ii) data associating the work item with one or more build runs that each correspond to at least one of the one or more code changes specified as involving the work item;
obtaining a user input selecting the work item; and
in response to the user input,
    causing respective identifiers of at least one build run of the one or more build runs associated with the work item to be displayed to a user, including causing an identifier of the at least one build run to be displayed to the user.

19. A non-transitory computer readable storage medium storing one or more programs configured to be executed by a computer system to perform software development, the one or more programs comprising instructions for:
    receiving successive code changes for a software product;
    receiving input specifying that one or more code changes involve a work item associated with development of the software product, wherein a work item specifies a feature to be added to the software product or a defect to be removed from the software product;
    generating a plurality of build runs of the software product, respective build runs corresponding to one or more of the successive code changes;
    storing data associating the work item with one or more build runs that each correspond to at least one of the one or more code changes specified as involving the work item;
    obtaining a user input selecting the work item; and
    in response to the user input,
        causing respective identifiers of at least one build run of the one or more build runs associated with the work item to be displayed to a user, including causing an identifier of the at least one build run to be displayed to the user.

\* \* \* \* \*